US012786323B2

(12) United States Patent
Akizuki

(10) Patent No.: US 12,786,323 B2
(45) Date of Patent: Nov. 3, 2026

(54) INSPECTION APPARATUS THAT INSPECTS IMAGE PRINTED ON SHEET, AND IMAGE INSPECTION METHOD

(71) Applicant: CANON KABUSHIKI KAISHA, Tokyo (JP)

(72) Inventor: Itsuki Akizuki, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 242 days.

(21) Appl. No.: 18/635,346

(22) Filed: Apr. 15, 2024

(65) Prior Publication Data

US 2024/0357044 A1 Oct. 24, 2024

(30) Foreign Application Priority Data

Apr. 20, 2023 (JP) ................................ 2023-069519

(51) Int. Cl.
*H04N 1/00* (2006.01)
*G06F 3/12* (2006.01)
*G06K 15/02* (2006.01)

(52) U.S. Cl.
CPC ..... *H04N 1/00408* (2013.01); *H04N 1/00013* (2013.01); *H04N 1/00037* (2013.01); *H04N 1/00769* (2013.01); *H04N 2201/0081* (2013.01); *H04N 2201/0458* (2013.01)

(58) Field of Classification Search
None
See application file for complete search history.

(56) References Cited

U.S. PATENT DOCUMENTS

2021/0141577 A1* 5/2021 Ito ......................... G06F 3/1256
2021/0216261 A1* 7/2021 Kobashi ............. H04N 1/00005
2021/0256677 A1* 8/2021 Kobashi ................. G06V 30/40
2022/0012867 A1* 1/2022 Tsukamoto ........... G06F 3/1234
2022/0126601 A1* 4/2022 Mutsuno ............ G03G 15/5062

FOREIGN PATENT DOCUMENTS

JP 2002344759 * 11/2002 ............... G06T 1/00
JP 2007148027 * 6/2007 ............ G03G 21/00
JP 2011114574 A 6/2011
JP 2015230687 A 12/2015
(Continued)

*Primary Examiner* — Beniyam Menberu
(74) *Attorney, Agent, or Firm* — ROSSI, KIMMS & McDOWELL LLP

(57) ABSTRACT

An inspection apparatus displays a first plurality of inspection levels in a case where a first image forming apparatus is connected to the inspection apparatus. The inspection apparatus displays a second plurality of inspection levels in a case where a second image forming apparatus is connected to the inspection apparatus. An upper limit for the second plurality of inspection levels is higher than an upper limit for the first plurality of inspection levels. The inspection apparatus obtains information indicating a selection result of selecting the inspection level. The inspection apparatus determines an inspection standard based on the information. A display displays an inspection level that corresponds to the inspection standard used to determine an inspection result for an inspection item such that the inspection level is selectable from among a plurality of inspection levels.

20 Claims, 14 Drawing Sheets

(56) References Cited

FOREIGN PATENT DOCUMENTS

| | | | | |
|---|---|---|---|---|
| JP | 2015230688 | * | 12/2015 | G06F 3/12 |
| JP | 2021180404 | * | 11/2021 | G06T 1/00 |
| JP | 2022157080 A | | 10/2022 | |
| JP | 2022170678 | * | 11/2022 | G01N 21/892 |
| JP | 2022170678 A | | 11/2022 | |
| JP | 2023030525 | * | 3/2023 | G03G 15/00 |

* cited by examiner

FIG. 9

514

| IDENTIFICATION INFORMATION | IMAGE FORMING ACCURACY | UPPER LIMIT VALUE OF INSPECTION LEVEL |
|---|---|---|
| IMAGE FORMING APPARATUS A | IMAGE FORMING ACCURACY A | 8 |
| IMAGE FORMING APPARATUS B | IMAGE FORMING ACCURACY B | 9 |
| IMAGE FORMING APPARATUS C | IMAGE FORMING ACCURACY C | 10 |

INSPECTION APPARATUS THAT INSPECTS IMAGE PRINTED ON SHEET, AND IMAGE INSPECTION METHOD

BACKGROUND OF THE INVENTION

Field of the Invention

The present invention relates to an inspection apparatus that inspects an image printed on a sheet, and an image inspection method.

Description of the Related Art

An inspection apparatus can perform an inspection while conveying a sheet on which an image has been formed by an image forming apparatus. In the inspection, the image formed on the sheet is inspected for black spots or streaks, for example. Japanese Patent Laid-Open No. 2022-170678 describes a user setting an inspection level indicating the strictness of an inspection.

The allowed size of black spots or the allowed thickness of streaks depends on the type of image forming apparatus. For example, expensive, high-performance image forming apparatuses are designed to prevent black spots or streaks from appearing on sheets to the greatest extent possible. As such, when images on sheets are inspected at the inspection level set by the user, the number of sheets determined to have failed may increase, depending on the type of image forming apparatus to which the inspection apparatus is connected.

SUMMARY OF THE INVENTION

The present disclosure provides an inspection apparatus capable of connecting to each of a first image forming apparatus and a second image forming apparatus having a higher printing accuracy than the first image forming apparatus, the inspection apparatus comprising: a reading sensor configured to read an image formed on a sheet by an image forming apparatus; an inspection unit configured to inspect an inspection item in the image read by the reading sensor; a display configured to display an inspection level that corresponds to an inspection standard used to determine an inspection result for the inspection item such that the inspection level is selectable from among a plurality of inspection levels; and a controller configured to: display a first plurality of inspection levels in a case where the first image forming apparatus is connected; display a second plurality of inspection levels in a case where the second image forming apparatus is connected, an upper limit for the second plurality of inspection levels being higher than an upper limit for the first plurality of inspection levels; obtain information indicating a selection result of selecting the inspection level; and determine the inspection standard based on the information.

Further features of the present invention will become apparent from the following description of exemplary embodiments (with reference to the attached drawings).

BRIEF DESCRIPTION OF THE DRAWINGS

FIG. 9 is a diagram illustrating a determination table.

DESCRIPTION OF THE EMBODIMENTS

Figure 1:
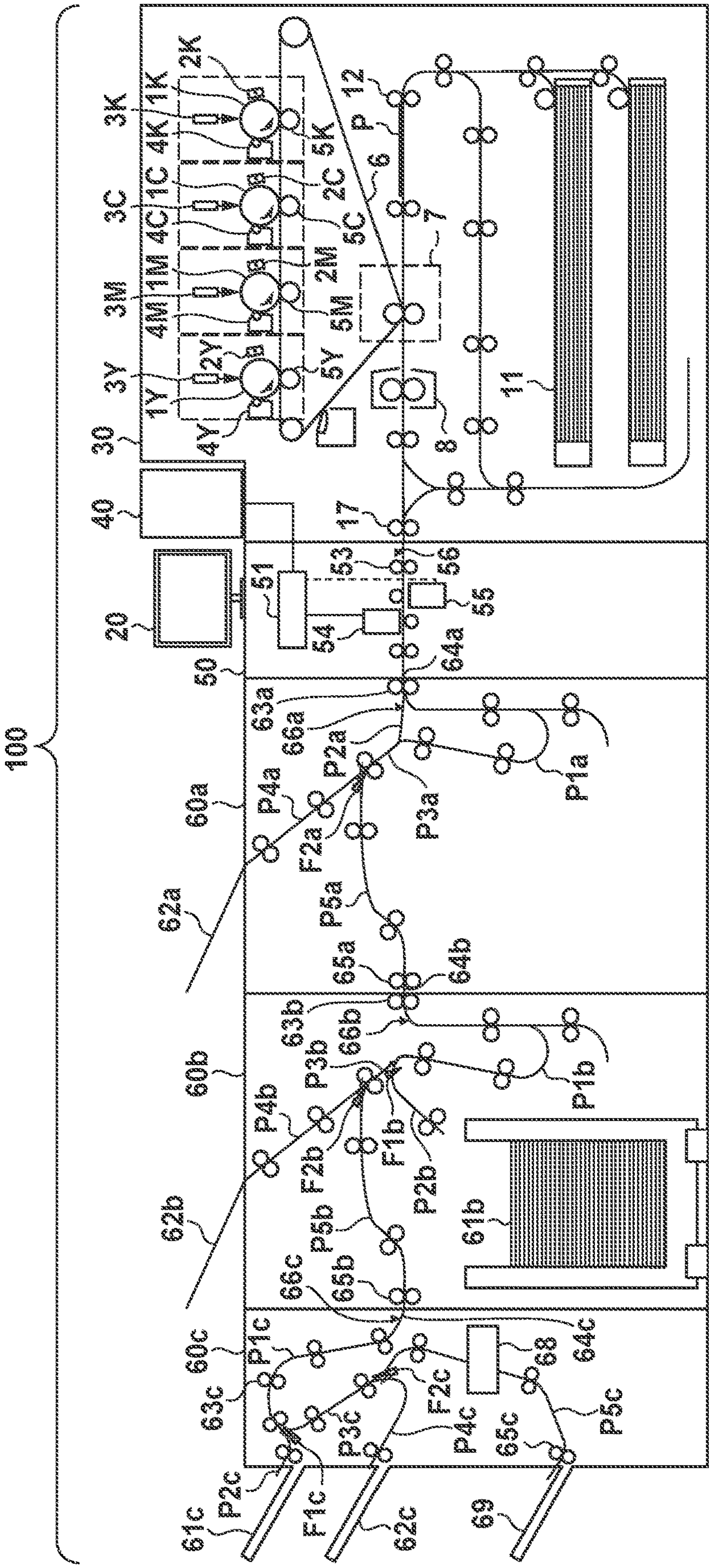
FIG. 1 is a diagram illustrating an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(1) Image Forming System

As illustrated in FIG. 1, an image forming system 100 includes an operation unit 20, an image forming apparatus 30, a control apparatus 40, an inspection apparatus 50, and stacking apparatuses 60*a*, 60*b*, and 60*c*. The image forming apparatus 30, the inspection apparatus 50, and the stacking apparatuses 60*a*, 60*b*, and 60*c* have separate housings. It is sufficient for the number of the stacking apparatuses 60 to be at least one. The image forming system 100 may be called an "image inspection system". In this example, the stacking apparatuses 60*a* and 60*b* may be called "sheet stackers" or "sheet conveyance apparatuses". The stacking apparatus 60*c* may be called a "post-processing apparatus" or "finisher" having functions for post-processing. Multiple constituent elements that are the same or similar are given the same reference signs. The lowercase letters at the ends may be omitted when describing matters which are common to all items.

The operation unit 20 includes a display device that outputs information to a user and an input device that accepts instructions from the user (e.g., a touch panel sensor). The operation unit 20 may be provided in the housing of the image forming system 100, or may be attached to the exterior of the housing of the image forming system 100. The image forming apparatus 30 forms a toner image on a sheet P in accordance with Y, M, C, and K color signals supplied from the control apparatus 40. The letters Y, M, C, and K appended to the reference signs indicate the toner colors yellow, magenta, cyan, and black. When matters common to all four colors are described, the letters Y, M, C, and K will be omitted from the reference signs.

A photosensitive member 1 is an image carrier that carries an electrostatic latent image and a toner image. A charger 2 uniformly charges the surface of the photosensitive member 1. An exposure device 3 forms an electrostatic latent image by irradiating the photosensitive member 1 with a laser beam according to the color signal supplied from the control apparatus 40. A developer 4 uses toner to develop the electrostatic latent image and forms a toner image. A primary transfer roller 5 transfers the toner image from the photosensitive member 1 to an intermediate transfer belt 6. Here, Y, M, C, and K toner images are superimposed to form a color image. The intermediate transfer belt 6 conveys the toner image to a secondary transfer section 7.

A sheet cassette 11 is a holding unit that holds a large number of sheets P. A conveyance roller 12 feeds a sheet P contained in the sheet cassette 11 and conveys the sheet P along a conveyance path.

The secondary transfer section 7 transfers the toner image from the intermediate transfer belt 6 to the sheet P. A fixer 8 fixes the toner image onto the sheet P by applying heat and pressure to the sheet P and the toner image. A discharge roller 17 discharges the sheet P to the inspection apparatus 50.

The inspection apparatus 50, implemented as a reading apparatus, is an apparatus that reads an image formed on a sheet P and inspects the quality of the image. In other words, the inspection apparatus 50 is an apparatus that inspects whether the image formed on the sheet P satisfies an inspection standard. The sheet P on which the image is formed is sometimes called a "printed product" (a "deliverable").

The image on the sheet P being conveyed by conveyance rollers 53 is read at a reading position by image sensors 54 and 55. The image sensors 54 and 55 include a light source that illuminates the sheet P and a CMOS sensor. "CMOS" is an acronym for "Complementary Metal Oxide Film Semiconductor". The image sensors 54 and 55 may be called "cameras" or "image capturing devices". The image sensors 54 and 55 also function as a reading unit that reads a sheet P on which an image has been formed by the image forming apparatus 30 and obtains a printing result from the sheet P (a "reading result" or a "read image").

The sheet P from which the image has been read is discharged to the stacking apparatuses 60. Note that for a sheet P which is determined to be a "no good" (i.e., does not satisfy the inspection standard; this may also be called "failing") by the inspection apparatus 50, the control apparatus 40 controls the image forming apparatus 30 to form the same image on a new sheet P. An inlet of the inspection apparatus 50 is provided with a sheet sensor 56 that detects the sheet P.

The stacking apparatus 60*a* receives the sheet P discharged from the inspection apparatus 50 through an inlet 64*a*, and discharges the sheet P to a sheet tray 62*a* serving as a stacking unit, discharges the sheet P from an outlet 65*a*, or the like. A sheet sensor 66*a* that detects the sheet P is provided at the inlet 64*a*.

A branch between a conveyance path P1*a* and a conveyance path P2*a* is located downstream from the inlet 64*a*. A flapper (not shown) is disposed at the branch, and guides the sheet P to either the conveyance path P1*a* or the conveyance path P2*a*. The conveyance paths P1*a* and P2*a* are each connected to a conveyance path P3*a*.

The conveyance path P3*a* branches to a conveyance path P4*a* and a conveyance path P5*a* at a branch position where a flapper F2*a* is installed. The sheet P that has been conveyed by the conveyance path P3*a* is guided to the conveyance path P4*a* or the conveyance path P5*a* by the flapper F2*a*.

The sheet tray 62*a* is provided at an outlet of the conveyance path P4*a*. For example, a sheet P having an image quality determined to have failed by the inspection apparatus 50 may be stacked on the sheet tray 62*a*. However, a sheet P having an image quality determined to have failed may be discharged to an apparatus in the later stage from the outlet 65*a*. A sheet P determined to be "OK" (i.e., satisfies the inspection standard; this may also be called "passing") may be stacked onto (discharged to) the sheet tray 62*a*. The conveyance path P5*a* extends to the outlet 65*a*.

The stacking apparatus 60*b* receives the sheet P discharged from the stacking apparatus 60*a* through an inlet 64*b*, and stacks (discharges) the sheet P onto sheet trays 61*b* and 62*b* serving as stacking units, discharges the sheet P from an outlet 65*b*, or the like. A sheet sensor 66*b* that detects the sheet P is provided at the inlet 64*b*.

A conveyance path P1*b* extending from the inlet 64*b* branches to a conveyance path P2*b* and a conveyance path P3*b* at a branch position where a flapper F1*b* is installed. The sheet P that has been conveyed through the conveyance path P1*b* is guided to the conveyance path P2*b* or the conveyance path P3*b* by the flapper F1*b*. The sheet tray 61*b* is provided at an outlet of the conveyance path P2*b*. The sheet tray 61*b* is a large-capacity sheet stacking unit on which a large number of sheets P can be stacked. For example, a sheet P which has passed the image inspection (quality inspection) may be stacked on the sheet tray 61*b*.

The conveyance path P3*b* branches to a conveyance path P4*b* and a conveyance path P5*b* at a branch position where a flapper F2*b* is installed. The sheet P that has been conveyed through the conveyance path P3*b* is guided to the conveyance path P4*b* or the conveyance path P5*b* by the flapper F2*b*.

The sheet tray 62*b* is provided at an outlet of the conveyance path P4*b*. For example, a sheet P having an image quality determined to have failed by the inspection apparatus 50 may be stacked on the sheet tray 62*b*. However, a sheet P having an image quality determined to have failed may be discharged to an apparatus in the later stage from the outlet 65*b*. A sheet P determined to be "OK" (i.e., satisfies the inspection standard; this may also be called "passing") may be stacked onto the sheet tray 62*b*. The conveyance path P5*b* extends to the outlet 65*b*.

An apparatus in a later stage may be connected to the outlet 65*b*. Additionally, as with the stacking apparatus 60*c*, a sheet tray 69 may be provided at an outlet 65*c*. The sheet tray 69 can also stack sheets P for which the image quality is determined to have failed and sheets P for which the image quality is determined to have passed. In this manner, the type of the sheet P discharged to the sheet trays 61*b*, 61*c*, 62*a*, 62*b*, 62*c*, and 69 is determined in advance based on settings made by the user.

The sheet trays 61*c*, 62*c*, and 69 provided in the stacking apparatus 60*c* may be called an upper tray, a middle tray, and a lower tray, respectively. A post-processing unit 68 may include a stapling processor that bundles the sheets P discharged from the stacking apparatus 60*b* to form a sheet bundle and staples the sheet bundle. The post-processing unit 68 may include a binding processor that folds sheet bundle in half. The post-processing unit 68 may include a cutting processor that cuts a sheet bundle.

Each of the conveyance paths P1, P2, P3, P4, and P5 is provided with one or more conveyance rollers 63. The conveyance rollers 63 convey the sheet P from the upstream side to the downstream side in a conveyance direction of the sheet P. The conveyance rollers 63 may be roller pairs each including two rollers that convey the sheet P with the sheet P located therebetween.

Note that it is sufficient for the number of stacking apparatuses 60 connected to the downstream side of the inspection apparatus 50 to be at least one. In addition, it is sufficient for the number of sheet trays 61, 62, and 69 provided in the stacking apparatus 60 connected to the downstream side of the inspection apparatus 50 to be at least two total in the image forming system 100. In addition, it is sufficient for the number of flappers F1 and F2 to be at least one.

Note that a conveyance path from the reading position where the image sensor 54 reads the image on the sheet (or where the image sensor 55 reads the image on the sheet) to a branch position of a flapper F2*c* may be called a "main path". The conveyance path P4*a* that branches from the main path at the branch position of the flapper F2*a* may also be called a "branch path". Likewise, the conveyance path P2*b* that branches from the main path at the branch position of the flapper F1*b* may also be called a "branch path". Furthermore, the conveyance path P4*b* that branches from the main path at the branch position of the flapper F2*b* may also be called a "branch path". Further still, a conveyance path P2*c* that branches from the main path at the branch position of a flapper F1*c* may also be called a "branch path". Finally, a conveyance path P4*c* that branches from the main path at the branch position of the flapper F2*c* may also be called a "branch path". In the stacking apparatus 60*a* illustrated in FIG. 1, the path from the reading position through the conveyance path P1*a* corresponds to the main path. In other words, the first branch path that branches from the main path corresponds to the conveyance path P4*a*. Each conveyance path functions as a conveyance path that guides the sheets.

(2) Controller

Figure 2:
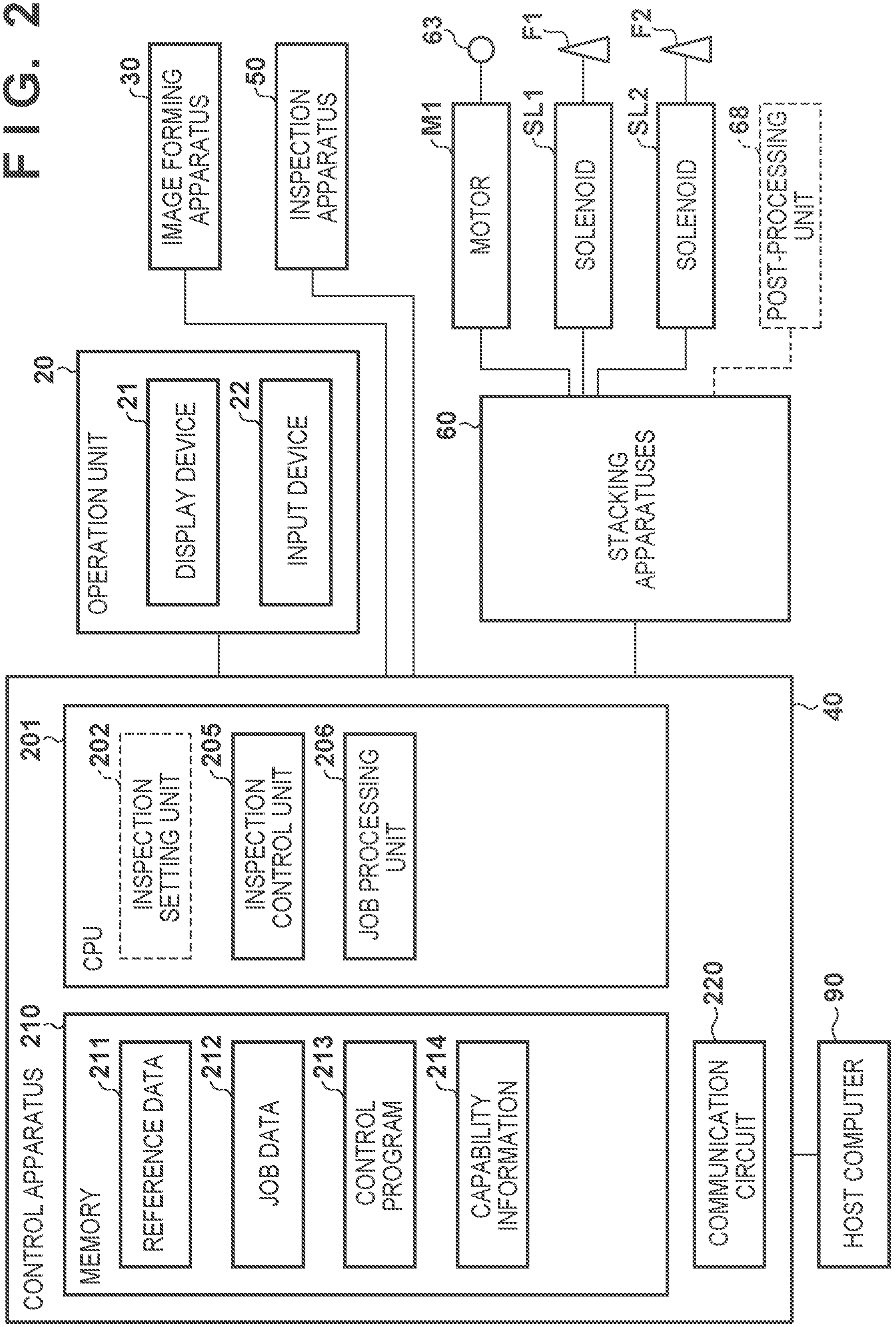
FIG. 2 is a diagram illustrating a control apparatus.

FIG. 2 illustrates the control apparatus 40 in detail. The control apparatus 40 may be provided within the housing of the image forming apparatus 30, or may be provided outside the housing of the image forming apparatus 30. A CPU 201 implements a plurality of functions by executing a control program 213 stored in a memory 210. The CPU 201 may include a plurality of processors or CPU cores. Some or all of the plurality of functions implemented by the CPU 201 may be implemented by hardware circuitry different from the CPU 201. The memory 210 is a storage device including a read-only memory (ROM), a random access memory (RAM), a solid-state drive (SSD), a hard disk drive (HDD), or the like. A communication circuit 220 includes a network interface that connects to a local area network, and a communication interface that communicates with the image forming apparatus 30, the inspection apparatus 50, the stacking apparatuses 60, and a host computer 90. The CPU 201 communicates with the image forming apparatus 30, the inspection apparatus 50, and the stacking apparatuses 60 through the communication circuit 220. The operation unit 20 includes a display device 21 and an input device 22. The operation unit 20 may include an audio circuit and a speaker that output messages to a user. The CPU 201 functions as an inspection setting unit 202, an inspection control unit 205, and a job processing unit 206 in accordance with the control program 213.

The inspection setting unit 202 displays an inspection settings screen and a job input screen in the display device 21 provided in the operation unit 20. The inspection setting unit 202 may be provided in the host computer 90. The inspection setting unit 202 accepts setting instructions, job execution instructions, and the like from the user through the input device 22 provided in the operation unit 20. The inspection setting unit 202 accepts settings for the discharge destination of the sheet P, inspection content (misalignment, color shift, tint variations, streaks, stain, and the like), and inspection level settings, for example. The inspection content may be called "inspection items". The sheets P may have different discharge destinations depending on whether the sheets P have passed the inspection or failed the inspection. The inspection level indicates the strictness of the image inspection. For example, as the numerical value indicating the inspection level increases, a higher printing accuracy is required. In other words, as the numerical value of the inspection level increases, a determination threshold (described later) decreases. However, a higher printing accuracy may be required as the numerical value indicating the inspection level decreases instead. The inspection setting unit 202 stores settings data, which is information pertaining to image inspection, such as the discharge destination, inspection content, inspection level, and the like set by the user through the display device 21, in the memory 210. The following will describe the settings data as being included in job data 212, but settings data independent from the job data 212 may be present instead.

The memory 210 further stores reference data 211 and capability information 214. The reference data 211 is comparison data used as passing criteria in the image inspection. The reference data 211 may be, for example, document image data (RIP image data) associated with a print job (the job data 212) received from the host computer 90. "RIP" is an acronym for "Raster Image Processing". The reference data 211 may be image data obtained by, for example, reading one or more sheets on which an image corresponding to a reference image is formed. The capability information 214 indicates the printing capabilities of the image forming apparatus 30.

"Printing capabilities" refers to the ability to provide a specific printing accuracy (image quality). For example, the charger 2 of an image forming apparatus 30 that provides a high image quality uses corona charging. "Corona charging" is a method in which a discharge is produced by applying a high voltage to a wire, and the photosensitive member 1 is then charged by that discharge. This makes it possible to uniformly charge the surface of the photosensitive member 1 in the width direction (a rotational axis direction) thereof, which makes unevenness in the darkness of the image less likely to occur. On the other hand, an image forming apparatus 30 that provides a relatively low image quality uses roller charging. "Roller charging" is a method in which a charging roller is brought into contact with the photosensitive member 1 to charge the photosensitive member 1. With roller charging, it is easy for the charge to vary in the width direction of the photosensitive member 1. This means that unevenness in the darkness of the image in the width direction is more likely to occur as well. Such unevenness in the darkness may appear as streaks.

The fixer 8 also affects the image quality, for example. The fixer 8 of an image forming apparatus 30 that provides a high image quality includes a fixing roller and a web (e.g., cloth) that cleans the surface of the fixing roller. The web wipes off toner remaining on the surface of the fixing roller by making contact with the surface of the fixing roller while the roller rotates. This makes it less likely for stain (black spots) to occur. The wiping by the web can be performed each time a predetermined plurality of sheets passes through the fixer 8, each time a print job ends, or each time a single sheet passes through the fixer 8. The fixer 8 of an image forming apparatus 30 that provides a relatively low image quality does not include a web. This means that stain (black spots) are more likely to occur.

In this manner, the image quality is determined depending on the structural components of the image forming apparatus 30 that are involved in the forming of images. The image quality (printing capabilities) of the image forming apparatus 30 can generally be identified based on identification information such as a serial number or the like.

The capability information 214 is collected from the image forming apparatus 30 by the CPU 201 through the communication circuit 220 when the image forming system 100 is started up, for example. The capability information 214 is information associated with the image forming apparatus 30. The capability information 214 may be any information capable of specifying an upper limit value for the inspection level that fits the printing capabilities of the image forming apparatus 30. For example, the capability information 214 may include identification information (e.g., a name or a serial number) of the image forming apparatus 30. This is because the identification information of the image forming apparatus 30 is associated with an upper limit value for the inspection level. The capability information 214 may include the upper limit value for the inspection level itself. Alternatively, the capability information 214 may include all inspection levels that fit the printing capabilities of the image forming apparatus 30. Conversely, the capability information 214 may include all inspection levels that do not fit the printing capabilities of the image forming apparatus 30. In this manner, the capability information 214 may be any information associated with the image forming apparatus 30, and may be information that does not indicate the printing capabilities of the image forming apparatus 30.

The inspection control unit 205 controls the inspection apparatus 50 based on the settings data included in the job data 212. For example, when the reference data 211 is requested by the inspection apparatus 50 through the communication circuit 220, the inspection control unit 205 sends the reference data 211 to the inspection apparatus 50. The inspection control unit 205 obtains information on the result of the image inspection from the inspection apparatus 50 serving as an inspection unit, through the communication circuit 220. Based on the inspection result, the inspection control unit 205 controls the flappers F1 and F2 to discharge the sheet P into the sheet tray, among the sheet trays 61, 62, and 69, which has been designated by the user.

The job processing unit 206 controls print jobs for printing images onto the sheets P, stacking jobs for stacking sheet bundles in the stacking apparatuses 60*a* and 60*b*, post-processing jobs for stacking sheet bundles in the stacking apparatus 60*c*, and the like. The job processing unit 206 holds the job data 212 required to execute the jobs in the memory 210.

The stacking apparatuses 60 drive a motor M1 to rotate the conveyance rollers 63 in accordance with control commands from the job processing unit 206. The stacking apparatuses 60 drive solenoids SL1 and SL2 to switch the flappers F1 and F2 in accordance with control commands from the job processing unit 206. As a result, the sheet P is guided and conveyed to either the sheet tray 61, the sheet tray 62, or the stacking apparatus 60*c*. For example, if the result of the image inspection by the inspection apparatus 50 is "no good" (fail), the job processing unit 206 controls the stacking apparatuses 60 to discharge the sheet P determined to have failed to the sheet tray 62. The image forming apparatus 30 also includes a solenoid that drives flappers and a motor that drives conveyance rollers, but these are not shown.

(3) Inspection Apparatus

Figure 3:
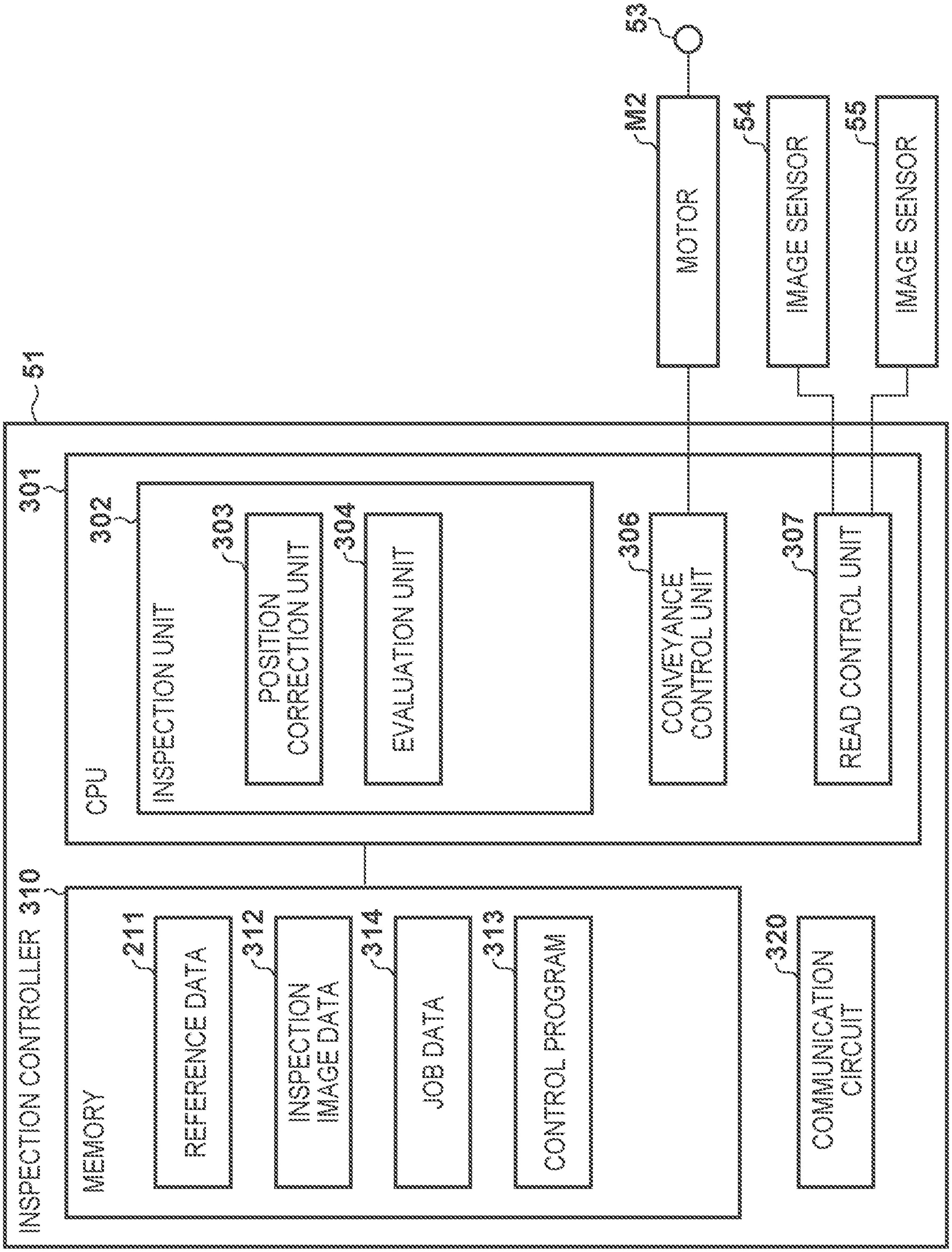
FIG. 3 is a diagram illustrating an inspection controller.

FIG. 3 illustrates an inspection controller 51 provided in the inspection apparatus 50 in detail. A CPU 301 implements a plurality of functions by executing a control program 313 stored in a memory 310. Some or all of the plurality of functions may be implemented by hardware circuitry different from the CPU 301. The memory 310 is a storage device including a ROM, a RAM, an SSD, an HDD, and the like. The CPU 301 is connected to the control apparatus 40 through a communication circuit 320, and receives various types of commands and data, sends inspection results, and the like.

An inspection unit 302 executes image inspection according to job data 314 (including settings data) received from the control apparatus 40 through the communication circuit 320, and sends an image inspection result to the control apparatus 40. Note that the CPU 201 may execute the inspection, or the host computer 90 connected to the image forming system 100 may execute the inspection. In these cases, the CPU 301 sends inspection image data 312 to the CPU 201 or the host computer 90.

A position correction unit 303 performs position correction on reading results from the image sensors 54 and 55. If the sheet P is read by the image sensors 54 and 55 while the sheet P is slanted, the sheet P may be slanted in the read image. The leading end of the sheet P may also deviate from an ideal position in the read image. The position correction unit 303 therefore corrects the position of the sheet P in the reading result by rotating the reading result, shifting coordinates, and the like.

The reference data 211 is comparison data used in the inspection of the image quality. The inspection image data (read image data) 312 is image data generated by the image sensors 54 and 55 reading the sheet P.

An evaluation unit 304 compares the reference data 211 with the inspection image data 312 and determines whether the image formed on the sheet P satisfies the inspection standard. For example, if the inspection content is "misalignment detection", the evaluation unit 304 may determine that the inspection is passed if the amount of misalignment between the position of the image in the reference data 211 and the position of the image in the inspection image data 312 is no greater than a predetermined value. The evaluation unit 304 may determine that the inspection has failed if the amount of misalignment exceeds the predetermined value. In other words, the amount of misalignment between the position of the image in the reference data 211 and the position of the image in the inspection image data 312 being no greater than the predetermined value corresponds to the inspection standard being satisfied. Meanwhile, the amount of misalignment between the position of the image in the reference data 211 and the position of the image in the inspection image data 312 being greater than the predetermined value corresponds to the inspection standard not being satisfied.

If the inspection content is set to "black spot detection", the evaluation unit 304 may determine that the inspection is passed if the size of a black spot which is not present in the image in the reference data 211, but which is present in the image in the inspection image data 312, is no greater than a determination threshold. In other words, a black spot corresponds to a noise image which is absent from the image corresponding to the reference data 211, but which is present in an image corresponding to the inspection image data 312 to which reduction processing has been applied. The evaluation unit 304 may determine that the inspection has failed if the size of the black spot exceeds the determination threshold. In other words, the size of the black spot not exceeding the determination threshold corresponds to the inspection standard being satisfied. On the other hand, the size of the black spot exceeding the determination threshold corresponds to the inspection standard not being satisfied.

Although misalignment detection and black spot detection are described in the present embodiment as the inspection content, these are merely examples. For example, streak detection or the like may be included as the inspection content. "Streak detection" refers to detecting a streak-shaped image that is not present in the original image. In other words, a streak corresponds to a noise image which is absent from the image corresponding to the reference data 211, but which is present in an image corresponding to the inspection image data 312 to which reduction processing has been applied. Streaks can occur when it is necessary to clean, replace, or repair a component involved in image formation. In other words, determination processing for determining whether a "streak" is present may be performed by finding the degree to which the image corresponding to the reference data 211 matches the image corresponding to the inspection image data 312 to which reduction processing (image processing) has been applied.

If the inspection content is "tint detection", the evaluation unit 304 calculates a tint difference between the image in the reference data 211 and the image in the inspection image data 312. The evaluation unit 304 may determine that the sheet P being inspected has passed if the difference is no greater than a threshold corresponding to the inspection level. The evaluation unit 304 may determine that the sheet P being inspected has failed if the difference exceeds the threshold. In other words, the difference in tint between the image in the reference data 211 and the image in the inspection image data 312 being no greater than the threshold corresponds to the inspection standard being satisfied. On the other hand, the difference in tint between the image in the reference data 211 and the image in the inspection image data 312 being greater than the threshold corresponds to the inspection standard not being satisfied.

In the present embodiment, the relative positions of the image in the reference data 211 and the image in the inspection image data 312 are inspected when the inspection content is "misalignment detection", but this is merely one example. For example, the absolute position of the image in the inspection image data 312 with respect to an edge of the sheet P may be inspected. In this case, if the distance between the absolute position of the image in the reference data 211 and the absolute position of the image in the inspection image data 312 is no greater than the threshold, the inspection is determined to be passed. If the distance exceeds the threshold, the inspection is determined to be failed.

The evaluation unit 304 generates an inspection result indicating the determination result and sends the inspection result to the control apparatus 40 and the stacking apparatuses 60 through the communication circuit 320. The control apparatus 40 discharges sheets P which have failed to the discharge destination designated by the user. The control apparatus 40 controls the image forming apparatus 30 to reprint the images of sheets P that have failed onto other sheets P.

A conveyance control unit 306 drives a motor M2 to rotate the conveyance rollers 53. A reading control unit 307 controls the image sensors 54 and 55 to read the sheet P and generate the inspection image data 312. The image sensor 54 reads a first surface of the sheet P, and the image sensor 55 reads a second surface of the sheet P. This enables images on both sides of the sheet P to be inspected in the present embodiment.

(4) Stacking Apparatuses

Figure 4:
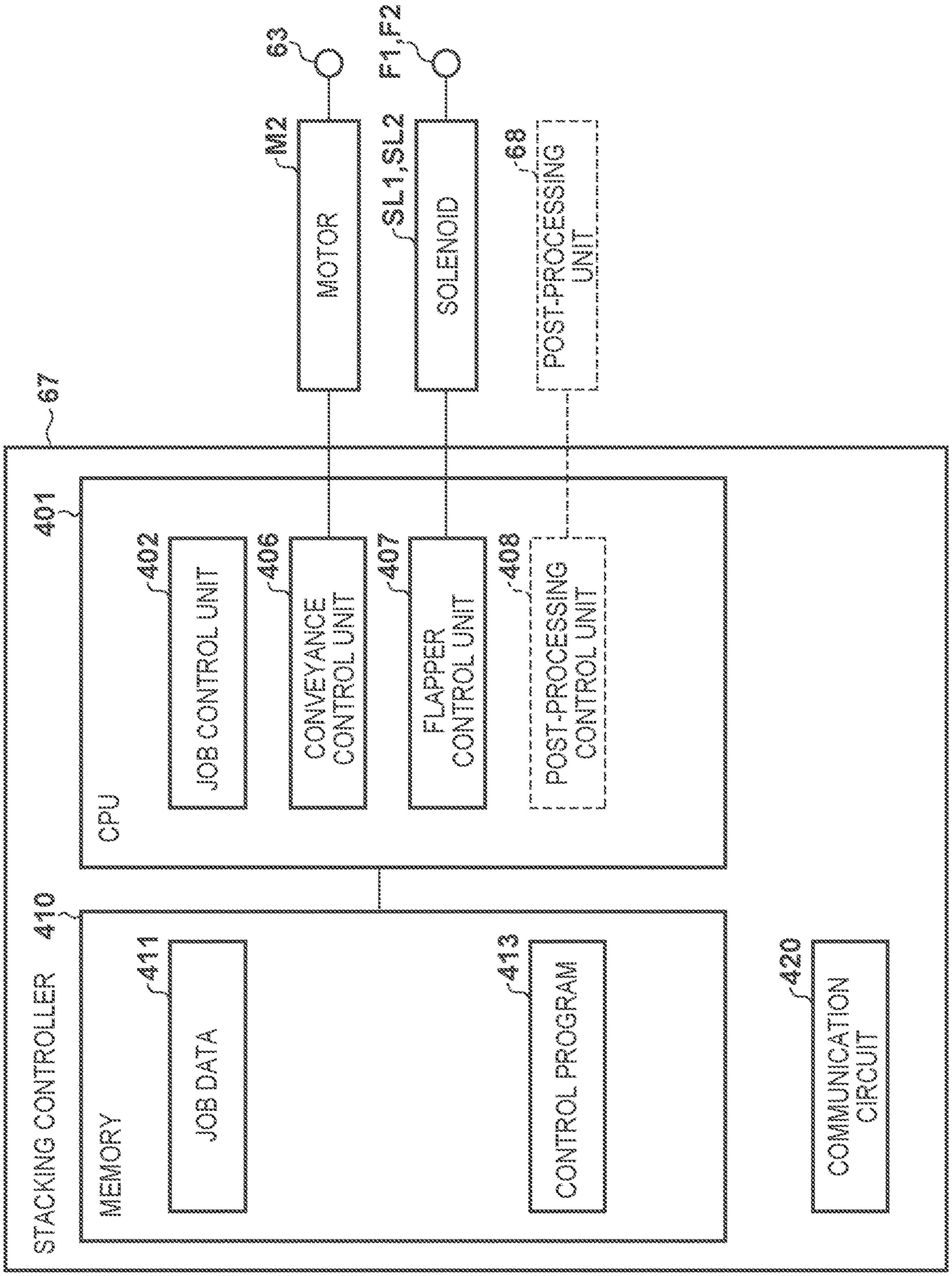
FIG. 4 is a diagram illustrating a stacking controller.

FIG. 4 illustrates a stacking controller 67 provided in each of the stacking apparatuses 60 in detail. A CPU 401 implements a plurality of functions by executing a control program 413 stored in a memory 410. Some or all of the plurality of functions may be implemented by hardware circuitry aside from the CPU 401. The memory 410 is a storage device including a ROM, a RAM, an SSD, an HDD, and the like. The CPU 401 is connected to the control apparatus 40 through a communication circuit 420, and receives various types of commands and data, sends execution results, and the like.

A job control unit 402 executes job data 411 from the control apparatus 40 through the communication circuit 420. The job data 411 includes information indicating the content of the job, for example. A conveyance control unit 406 starts the rotation of the motor M1 in accordance with a rotation command received from the control apparatus 40. The conveyance control unit 406 stops the rotation of the motor M1 in accordance with a stop command received from the control apparatus 40. The conveyance rollers 63 driven by the motor M1 rotate, stop, or the like as a result.

A flapper control unit 407 drives the solenoids SL1 and SL2 to switch the flappers F1 and F2 in accordance with switching commands received from the control apparatus 40 for each sheet P. The discharge destination of the sheet P is set as a result. Instead of switching commands received from the control apparatus 40, the flappers F1 and F2 may be controlled based on the inspection result received from the inspection apparatus 50.

If the stacking apparatus 60*c* is a post-processing apparatus, the stacking apparatus 60*c* includes a post-processing control unit 408. The post-processing control unit 408 controls the post-processing unit 68 in accordance with post-processing execution commands received from the control apparatus 40.

(5) Host Computer

Figure 5:
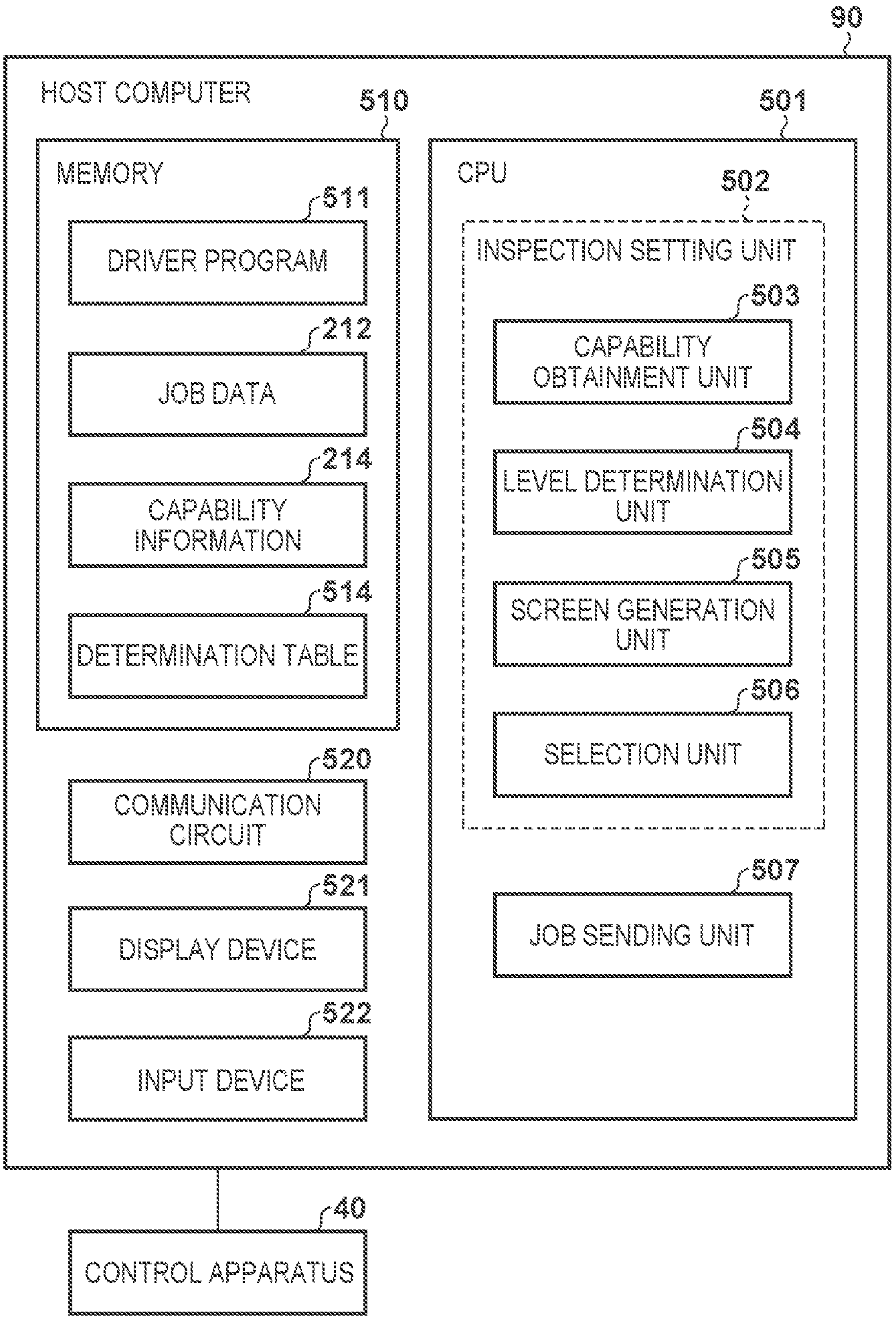
FIG. 5 is a diagram illustrating a host computer.

As illustrated in FIG. 5, the host computer 90 includes a CPU 501, a memory 510, a communication circuit 520, an input device 522, and a display device 521. The memory 510 is a storage device including a ROM, a RAM, an SSD, an HDD, and the like. The CPU 501 is connected to the control apparatus 40 through the communication circuit 520, and sends various types of commands and data, receives inspection results, and the like. The communication circuit 520 is communication circuitry for communicating with other devices over a wired network or a wireless network. The input device 522 includes a keyboard, a touch panel, or a pointing device. The display device 521 is a liquid crystal display, an organic EL display, or the like. "EL" is an acronym for "electroluminescence".

The CPU 501 implements various functions by executing a driver program 511 stored in the memory 510. An inspection setting unit 502 executes inspection settings equivalent to those of the inspection setting unit 202 included in the control apparatus 40. The inspection setting unit 502 includes various functions. A capability obtainment unit 503 obtains the capability information 214 of the image forming apparatus 30 from the control apparatus 40, and stores that information in the memory 510. A level determination unit 504 determines an inspection level corresponding to the capability information 214. Image inspection involves a plurality of inspection levels. If the inspection level is set too high for the printing capabilities of the image forming apparatus 30, a large number of sheets P can be determined to have failed. Discarding such sheets P, executing reprints, and the like waste significant amounts of the user's time. Accordingly, the level determination unit 504 specifies an inspection level that fits the printing capabilities of the image forming apparatus 30, specifies an inspection level that does not fit the printing capabilities of the image forming apparatus 30, and the like. A screen generation unit 505 generates a settings screen for the user to make the inspection settings, and causes the display device 521 to display the settings screen. A selection unit 506 selects a single inspection level from a plurality of inspection levels displayed in the settings screen as options, in accordance with an instruction from the user. The selection unit 506 may determine the inspection level corresponding to the capability information 214 by referring to a determination table 514 stored in the memory 510. Note that the capability information 214 may indicate all the inspection levels that are selectable, all the inspection levels that are unselectable, an upper limit value for the inspection levels that are selectable, or the like. "Unselectable" in the following also includes situations where an inspection level actually cannot be selected, and where a specific inspection level can be selected but selecting that inspection level is not recommended. In other words, "unselectable" can also include a situation where the selection is not recommended.

A job sending unit 507 generates the job data 212 in accordance with user instructions input from the input device 522, and sends the job data 212 to the control apparatus 40. The job data 212 includes control information for causing the image forming system 100 to execute a print job or an inspection job.

(6) Settings Screen (User Interface)

Figure 6:
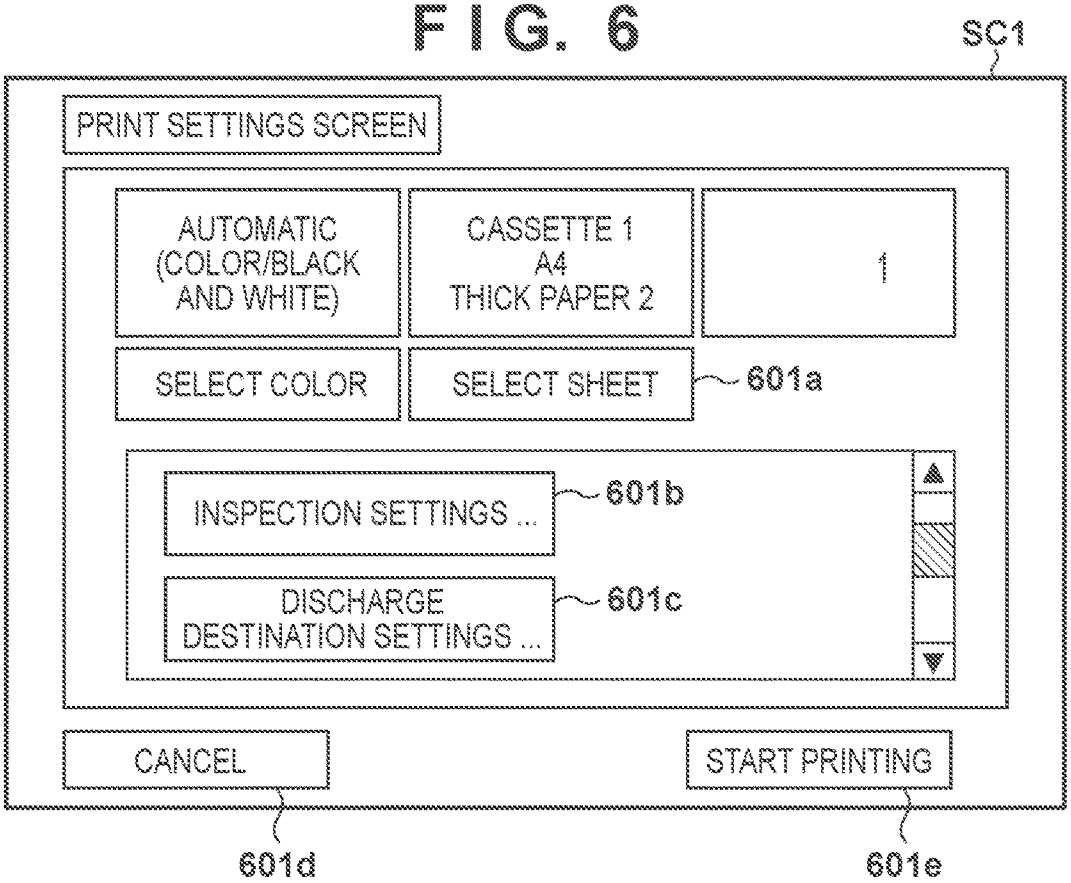
FIG. 6 is a diagram illustrating a print settings screen.
Figure 7:
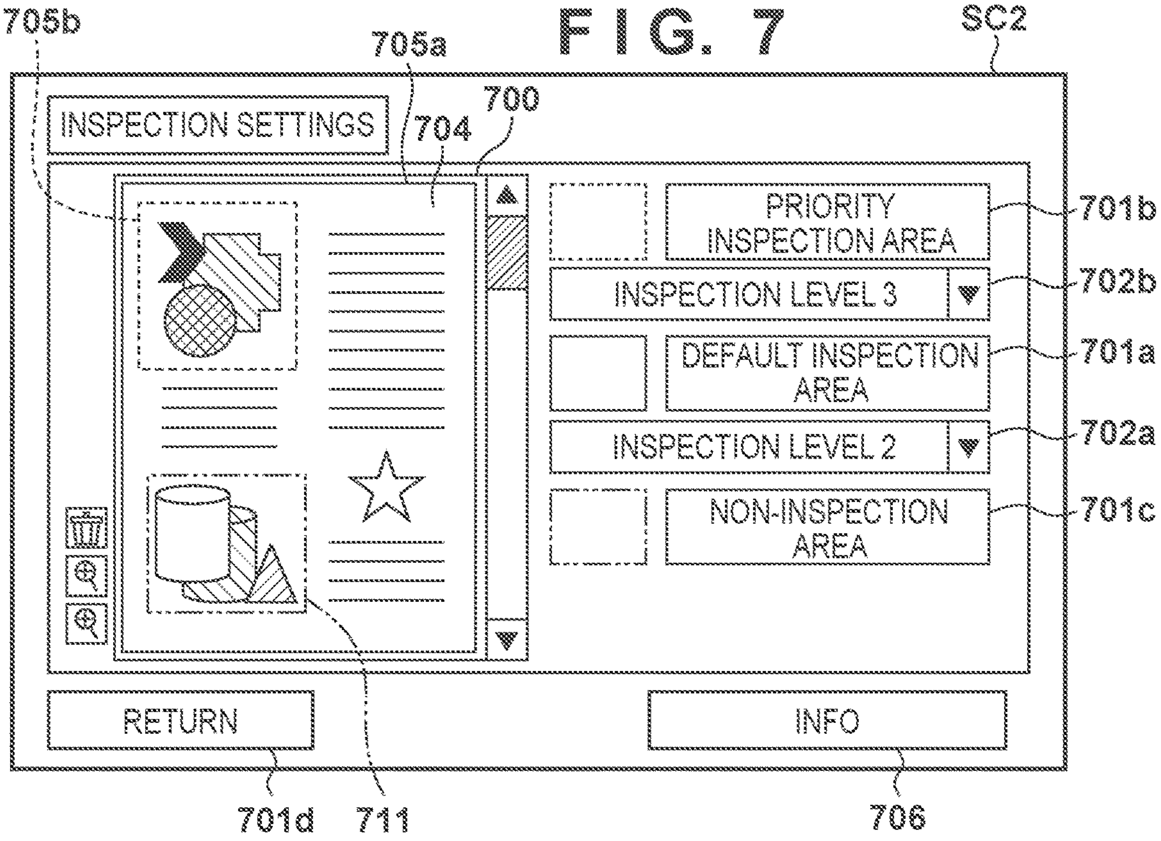
FIG. 7 is a diagram illustrating an inspection settings screen.

FIG. 6 illustrates a print settings screen SC1. The print settings screen SC1 may be called a "job input screen". A button 601*a* is a button for designating of the size of the sheet P to be printed on (including the length of the sheet in the conveyance direction), the basis weight, and the sheet cassette 11. A button 601*b* is a button for instructing a transition from the print settings screen SC1 to an inspection settings screen SC2 (FIG. 7). A button 601*c* is a button for instructing a transition from the print settings screen SC1 to a discharge destination settings screen. The discharge destination settings screen is a screen for accepting the selection or designation of a sheet tray to which sheets P which have passed the inspection are to be discharged, and a sheet tray to which sheets P which have failed the inspection are to be discharged. A button 601*d* is a button for instructing the content of the settings to be cancelled. When the button 601*d* is operated by an operator (the user), the screen transitions to a predetermined default screen. A button 601*e* is a button for instructing printing to start.

Figure 8A:
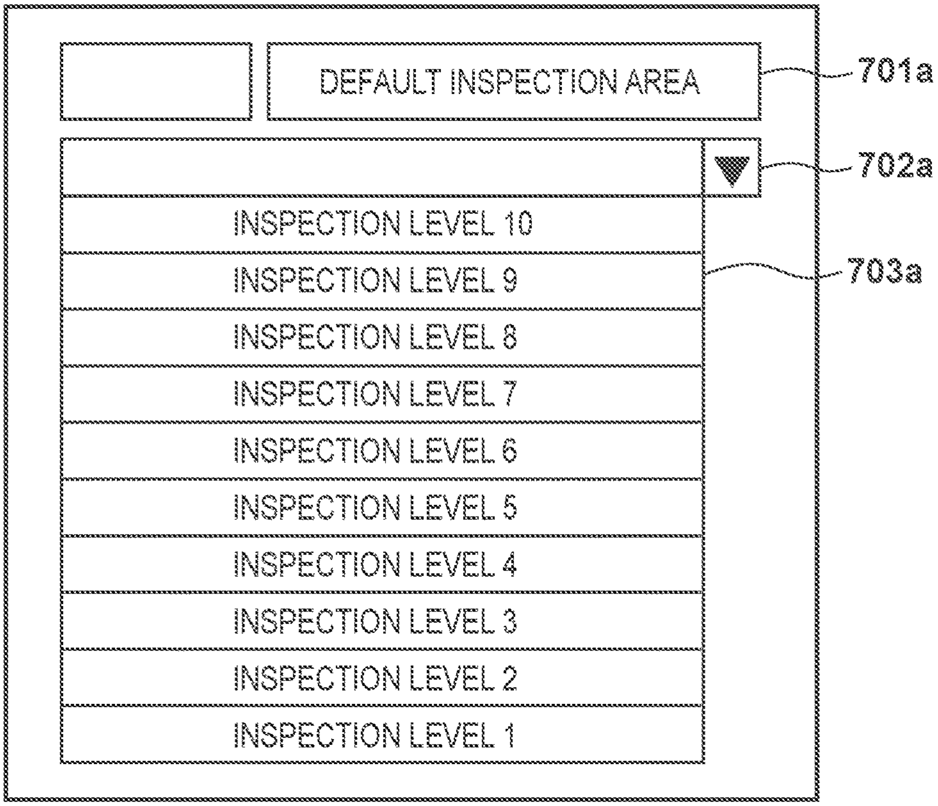
FIGS. 8A and 8B are diagrams illustrating a user interface for setting an inspection level.

FIG. 7 illustrates the inspection settings screen SC2. The inspection settings screen SC2 is a screen displayed in the display device 21 or the display device 521. The inspection settings screen SC2 accepts instructions from the operator for setting an inspection area, the inspection content, and the inspection level for the quality inspection performed by the inspection apparatus 50. In FIG. 7, a display region 700 displays an image 704 to be printed, inspection areas 705*a* and 705*b*, an inspection exclusion area 711, and the like. The operator sets the inspection areas 705*a* and 705*b* and the inspection exclusion area 711 for the image 704 by operating the input device 22 or the input device 522. The inspection area 705*a* is a default inspection area set by operating a button 701*a*. The default inspection area is, for example, an inspection area inspected according to default content. A menu 702*a* is a pull-down list for setting the inspection level (inspection accuracy) to be applied to the inspection area 705*a*. When the menu 702*a* is operated from the input device 22 or the input device 522, the entirety of a list 703*a* included in the menu 702*a* is displayed, as illustrated in FIG. 8A. The menu 702*a* may be called a "pull-down menu" or a "drop-down list". In this example, inspection level 1 has the lowest inspection accuracy. The inspection accuracy increases as the number of the inspection level increases. The user selects an inspection level for the deliverable from the list 703*a*.

The inspection area 705*b* is a priority inspection area set by operating a button 701*b*. The priority inspection area is, for example, an inspection area to be inspected at a high level of accuracy. In the example illustrated in FIG. 7, the graphic including the circle, the cross, and the like is subject to the high-accuracy inspection.

A menu 702*b* is a pull-down list for setting the inspection level (inspection accuracy) to be applied to the inspection area 705*b*. Like the menu 702*a*, a list included in the menu 702*b* is displayed when the menu 702*b* is operated.

The inspection exclusion area 711 is an area that is set not to be inspected, by operating a button 701*c*. For example, the cylinders and triangle may not require a high-accuracy inspection. A region including these graphics may therefore be set to the inspection exclusion area 711. In this manner, the inspection level can be set for each of regions present in the print target. The user can therefore set appropriate passing criteria. As a result, a printed product having a permissible quality is determined to pass, which reduces wasteful reprinting and improves productivity. The wasteful discarding of sheets P is also reduced.

A button 706 is a button for displaying detailed information about an inspection level that has become unselectable. The detailed information includes, for example, the reason why the inspection level is unselectable and conditions (e.g., the details of a task) required to change the inspection level to selectable. A button 701*d* is a button for returning to the print settings screen SC1 from the inspection settings screen SC2.

(7) Hiding Unselectable Inspection Level

The inspection apparatus 50 is an optional element for the image forming apparatus 30. Accordingly, the inspection apparatus 50 is designed to be connectable to a plurality of image forming apparatuses, each having a different image forming accuracy. For example, the inspection apparatus 50 can be connected to three types of image forming apparatuses 30. The host computer 90 obtains the capability information 214 (e.g., the upper limit value of the inspection level that can be applied) from the image forming apparatus 30 or the control apparatus 40, and stores the capability information 214 in the memory 510.

FIG. 9 illustrates an example of the determination table 514. Here, the inspection level is a numerical value from 1 to 10. The determination table 514 holds the identification information, the image forming accuracy, and the upper limit value of the inspection level of the image forming apparatus 30 in association with each other. In this example, three types of image forming apparatuses A, B, and C have image forming accuracies A, B, and C, respectively, as the capability information 214. The image forming accuracies A, B, and C are associated with inspection level upper limit values of 8, 9, and 10, respectively. In other words, the image forming apparatus A has an image forming accuracy A that satisfies inspection levels 1 to 8, which are no higher than the upper limit value of 8. The image forming accuracy A is an accuracy at which inspection levels 9 and 10, which exceed the upper limit value of 8, cannot be applied. The image forming apparatus B has an image forming accuracy B that satisfies inspection levels 1 to 9, which are no higher than the upper limit value of 9. The image forming accuracy B is an accuracy at which inspection level 10 cannot be applied. The image forming apparatus C has an image forming accuracy that satisfies inspection levels 1 to 10, which are no higher than the upper limit value of 10.

In this manner, the image forming accuracy may vary depending on the image forming apparatus 30. The image forming apparatus 30 therefore may not be able to satisfy the inspection level set in the inspection settings screen SC2. If the image forming apparatus 30 is unable to provide the image forming accuracy required by the inspection level set by the operator, deliverables determined to have failed may arise continuously. This results in deliverables which need to be discarded, which reduces the productivity of the image forming system 100. Accordingly, the capability information 214 (e.g., the image forming accuracy) of the image forming apparatus 30 is obtained, and only the inspection levels that fit the image forming accuracy are displayed so as to be selectable by the operator. An inspection level which fits the image forming accuracy may be identified based on the identification information included in the capability information 214 by referring to the determination table 514.

Figure 8B:
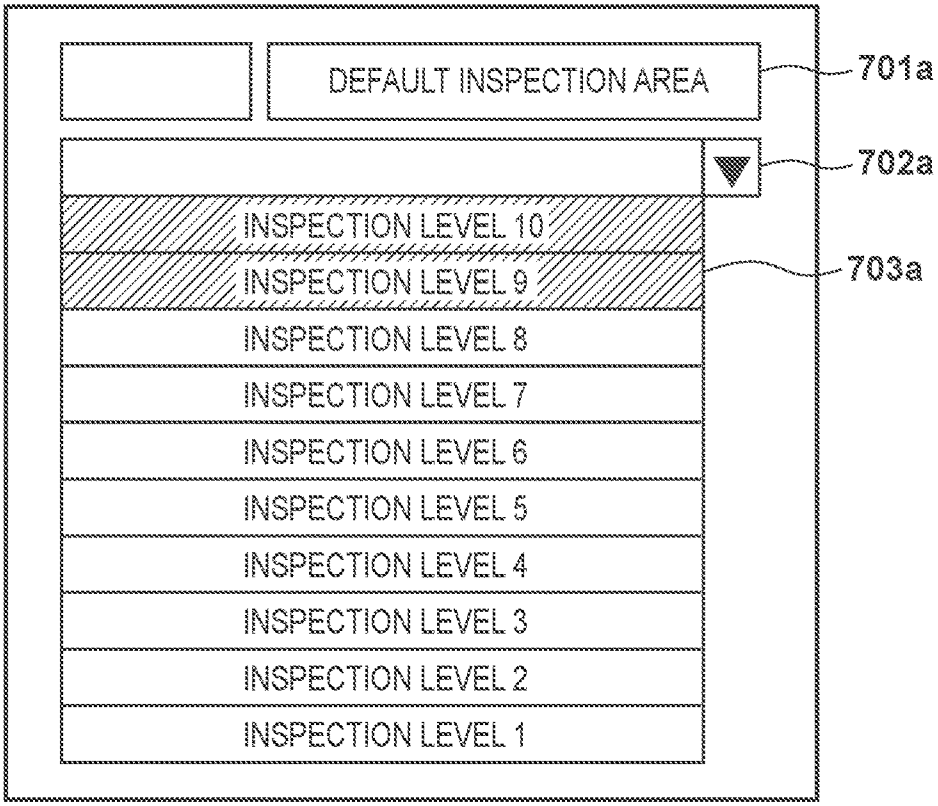

FIG. 8B illustrates an example in which inspection level 9 and inspection level 10 are displayed as unselectable in the list 703*a* of the menu 702*a*. In this example, inspection level 9 and inspection level 10 are grayed out. As a result, the operator can select one of inspection levels 1 to 8. Inspection level 9 and inspection level 10 need not be displayed.

On the other hand, as illustrated in FIG. 8A, inspection level 9 and inspection level 10 may be displayed as selectable in the list 703*a* of the menu 702*a*. When the user selects inspection level 9 and inspection level 10, a message prompting the user to review the selection may be displayed in the display device 521. The message may include, for example, a notification indicating to the user that inspection level 8 or lower should be selected. This makes it possible for the user to select an inspection level that fits the accuracy of the image formation. Note that graying out inspection level 9 and inspection level 10 and the making a notification prompting the inspection level to be changed corresponding to prohibiting the selection of inspection level 9 and inspection level 10, respectively.

Figure 10:
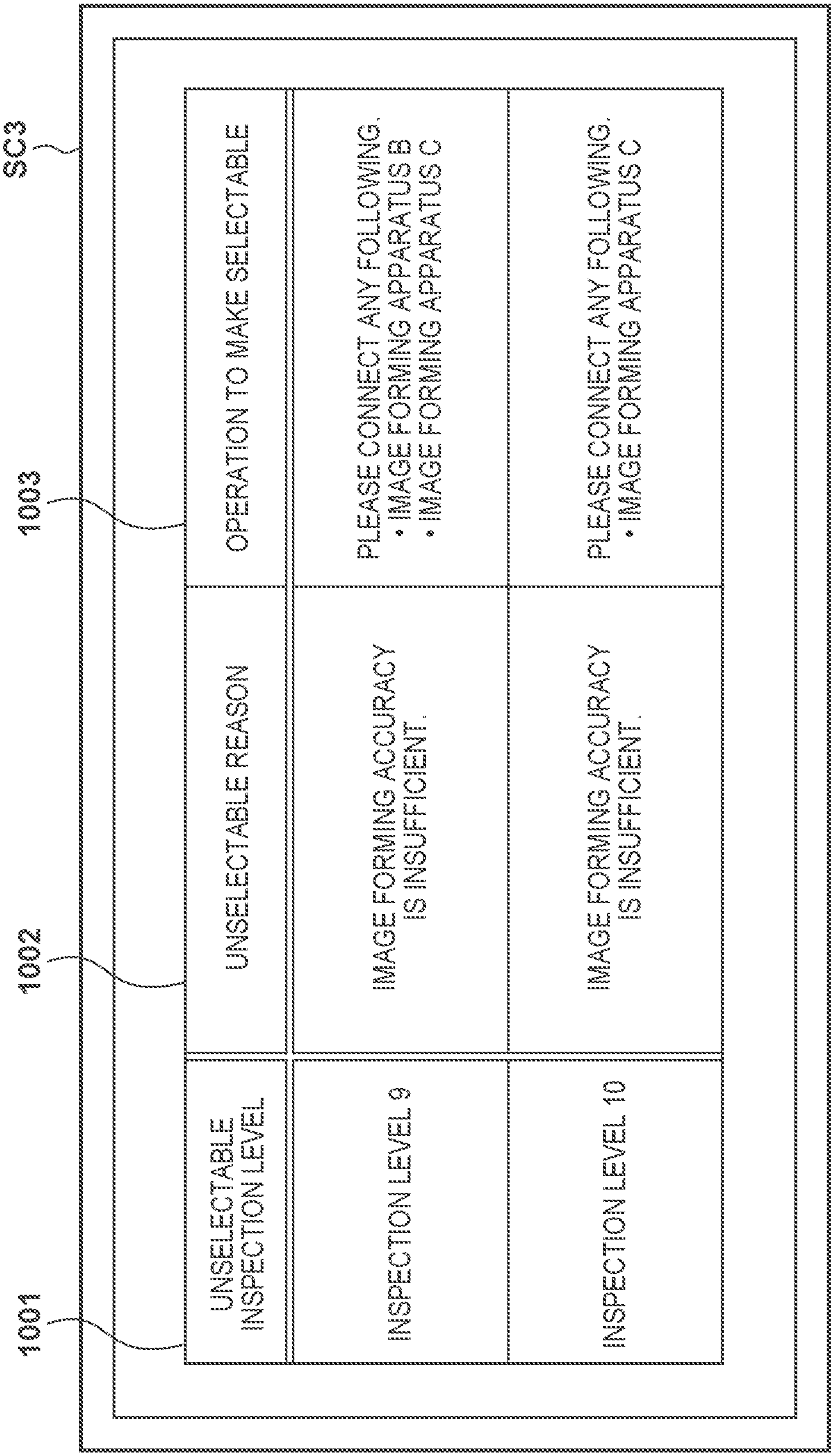
FIG. 10 is a diagram illustrating a screen that indicates detailed information on an inspection level that is unselectable.

FIG. 10 illustrates a details screen SC3 displayed when the button 706 is pressed. The screen generation unit 505 generates the details screen SC3 based on the unselectable inspection levels determined by the level determination unit 504, and displays the details screen in the display device 521. The details screen SC3 may be implemented as a pop-up window, for example. A box 1001 indicates the inspection level determined to be unselectable. In this example, the image forming apparatus 30 is assumed to be the image forming apparatus A, and that inspection levels 9 and 10 have been determined to be unselectable. A box 1002 indicates the reason why the corresponding inspection level is unselectable. Insufficient image forming accuracy is indicated as an example of the reason. A box 1003 indicates the details of an operation required to make the corresponding inspection level selectable. In this example, an indication is made to the effect that the image forming apparatuses B and C, which have higher image forming accuracies, should be connected to the image forming system 100. For example, to select inspection level 9, it is necessary to replace the image forming apparatus 30 with the image forming apparatus B or the image forming apparatus C. To select inspection level 10, it is necessary to replace the image forming apparatus 30 with the image forming apparatus C.

(8) Flowcharts

(8-1) Inspection Settings

Figure 11:
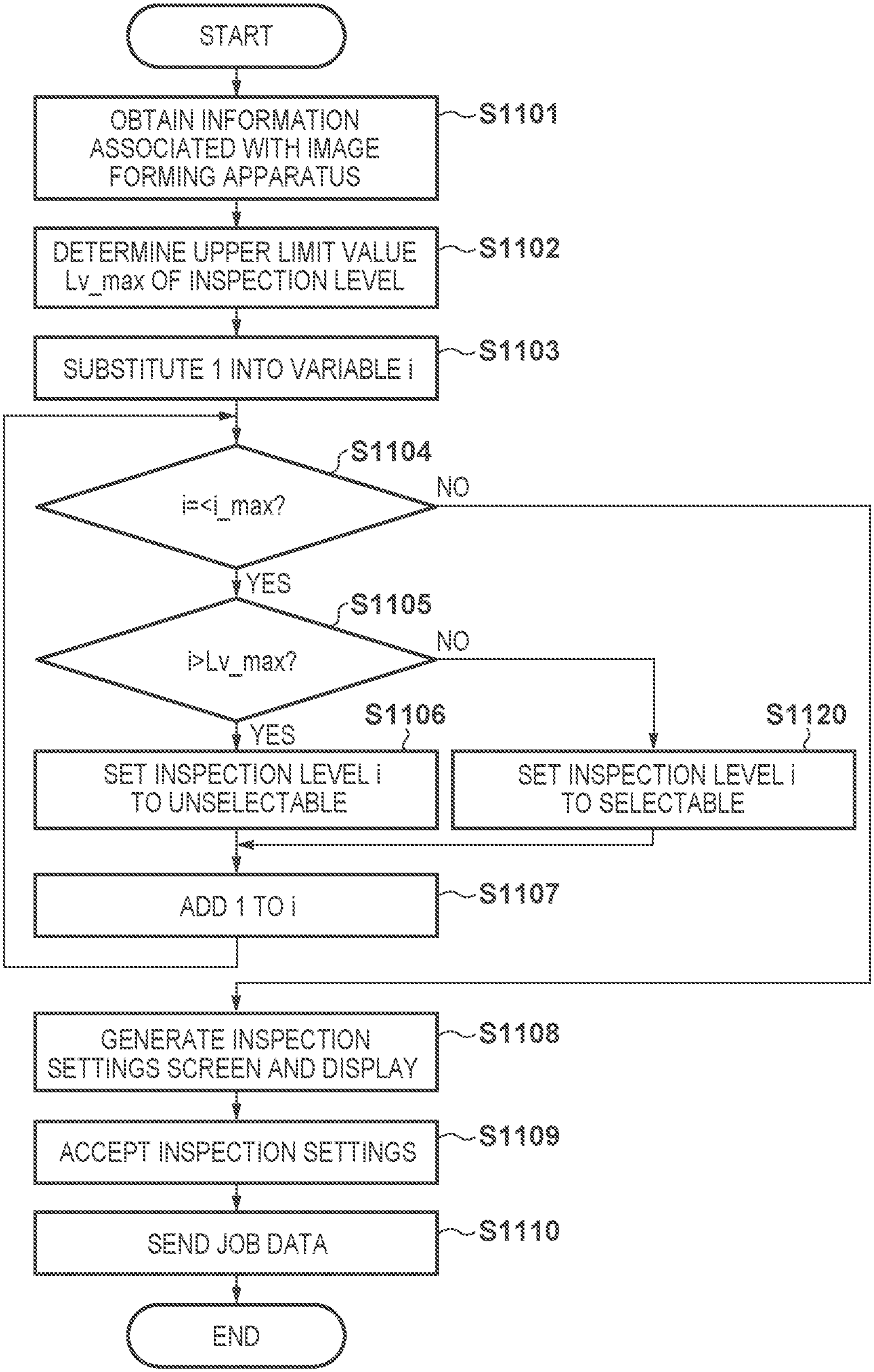
FIG. 11 is a flowchart illustrating inspection settings.

FIG. 11 illustrates the inspection settings made by the CPU 201 or the CPU 501. The inspection settings made by the CPU 501 will be described here as an example. For example, the inspection settings are made when the button 601*b* is pressed.

In step S1101, the CPU 501 (the capability obtainment unit 503) obtains the information associated with the image forming apparatus 30 (e.g., the capability information 214). For example, the CPU 501 accesses the control apparatus 40 through the communication circuit 520, and obtains the capability information 214 of the image forming apparatus 30. Alternatively, the CPU 501 accesses a server (not shown) through the communication circuit 520, and obtains the capability information 214 of the image forming apparatus 30. Or, the CPU 501 obtains the capability information 214 of the image forming apparatus 30 from the memory 510.

In step S1102, the CPU 501 (the level determination unit 504) sets an upper limit value Lv_max for the inspection level corresponding to the information associated with the image forming apparatus 30 (e.g., the capability information 214). For example, based on the image inspection accuracy included in the capability information 214, the CPU 501 refers to the determination table 514 and determines the upper limit value Lv_max for the inspection level. Alternatively, based on the identification information of the image forming apparatus 30 included in the capability information 214, the CPU 501 refers to the determination table 514 and determines the upper limit value Lv_max for the inspection level. Or, the CPU 501 may read out the upper limit value Lv_max for the inspection level included in the capability information 214.

In step S1103, the CPU 501 (the screen generation unit 505) substitutes 1 for a variable i. The variable i is an index indicating an inspection level of interest. In this example, i is an integer from 1 to 10.

In step S1104, the CPU 501 (the screen generation unit 505) determines whether the variable i is no greater than a maximum value i_max for the inspection level. As illustrated in FIG. 8A, the maximum value i_max is 10 in the present embodiment. If the variable i exceeds the maximum value i_max for the inspection level, the CPU 501 moves the sequence from step S1104 to step S1108. If the variable i is no greater than the maximum value i_max for the inspection level, the CPU 501 moves the sequence from step S1104 to step S1105.

In step S1105, the CPU 501 (the screen generation unit 505) determines whether the variable i exceeds the upper limit value Lv_max. If the variable i exceeds the upper limit value Lv_max, the CPU 501 moves the sequence from step S1105 to step S1106. In step S1106, the CPU 501 (the screen generation unit 505) sets the inspection level i to unselectable. For example, the inspection level i is grayed out in the list 703*a* of the menu 702*a*. The CPU 501 then moves the sequence from step S1106 to step S1107. In step S1107, the CPU 501 (the screen generation unit 505) adds 1 to the variable i. The CPU 501 then moves the sequence from step S1107 to step S1104.

On the other hand, if the variable i does not exceed the upper limit value Lv_max, the CPU 501 moves the sequence from step S1105 to step S1120. In step S1120, the CPU 501 (the screen generation unit 505) sets the inspection level i to selectable. The CPU 501 then moves the sequence from step S1120 to step S1107.

In step S1108, the CPU 501 (the screen generation unit 505) generates the inspection settings screen SC2 and displays the screen in the display device 521. For example, the CPU 501 generates the list 703*a* of the menu 702*a* based on the unselectable/selectable settings for inspection levels 1 to i_max, and generates the inspection settings screen SC2 including the menu 702*a*.

In step S1109, the CPU 501 (the selection unit 506) accepts the inspection settings through the inspection settings screen SC2. When the button 601*d* is pressed, and the button 601*e* in the print settings screen SC1 is then pressed, the CPU 501 moves the sequence from step S1109 to step S1110.

In step S1110, the CPU 501 (the job sending unit 507) generates the job data 212 based on the inspection settings and sends the job data 212 to the control apparatus 40. The control apparatus 40 controls the image forming system 100 according to the job data 212 to form an image on a sheet P and inspect the formed image.

If the inspection settings are made by the CPU 201 of the control apparatus 40, "CPU 501" is replaced with "CPU 201", and "memory 510" with "memory 210", in the foregoing descriptions. In other words, the inspection setting unit 502 illustrated in FIG. 5 is implemented by the CPU 201 as the inspection setting unit 202. Furthermore, "input device 522" is replaced with "input device 22". "Display device 521" is replaced with "display device 21". In this manner, the inspection settings may be made in the host computer 90, or may be made in the control apparatus 40.

(8-2) Control Apparatus Operations

Figure 12:
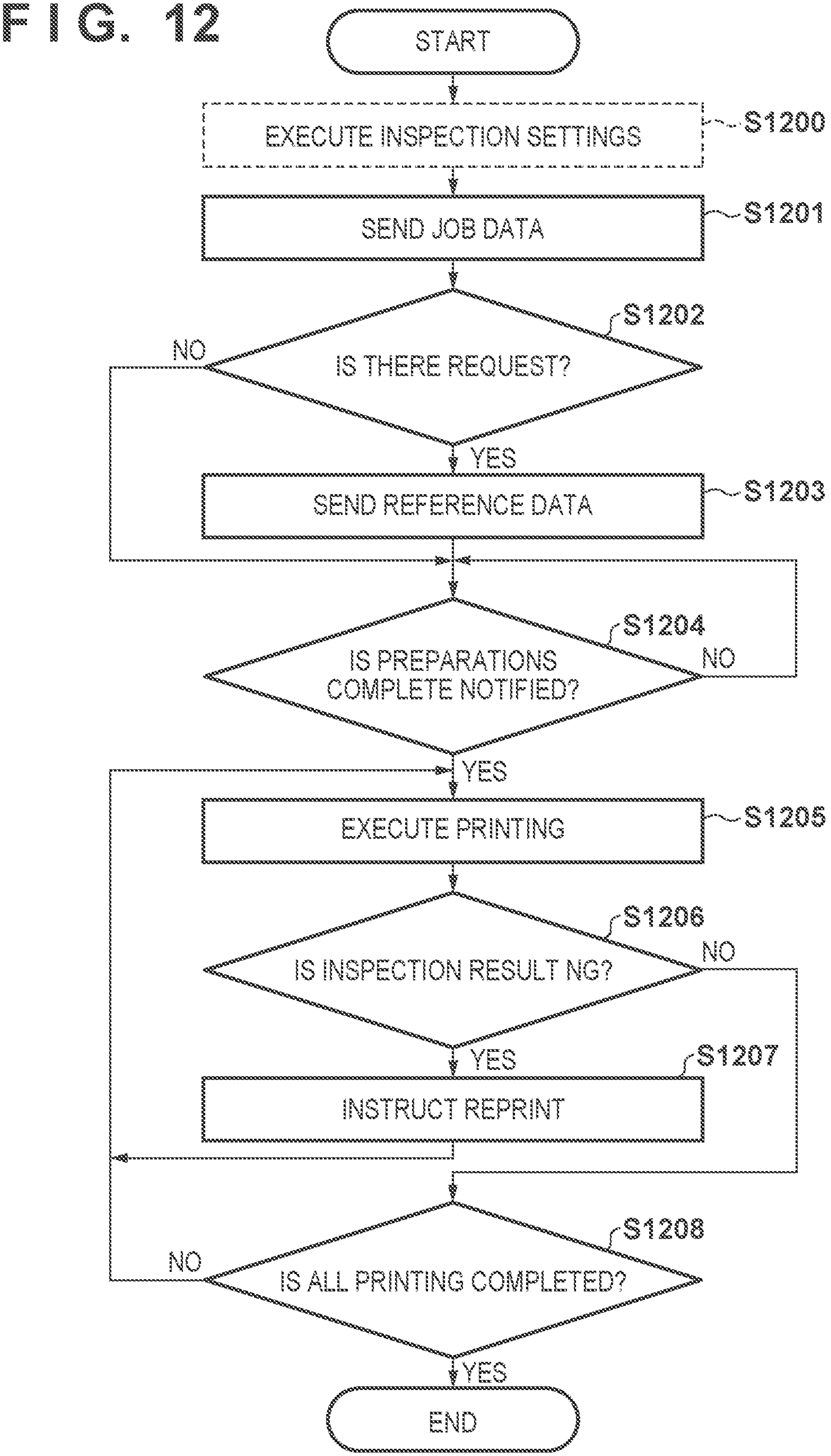
FIG. 12 is a flowchart illustrating a method for executing a job in the control apparatus.

FIG. 12 is a flowchart illustrating printing processing executed by the CPU 201 of the control apparatus 40. The CPU 201 executes the following processing when the button 601*e* is pressed and printing is instructed to start.

In step S1200, the CPU 201 (the inspection setting unit 202) executes steps S1101 to S1109 and step S1120 illustrated in FIG. 11. Note that step S1200 is skipped if the inspection settings are made in the host computer 90.

In step S1201, the CPU 201 (the job processing unit 206) generates the job data 314, including sheet information, the inspection settings, discharge destination information, and the like, based on the job data 212, and sends the job data 314 to the inspection apparatus 50. The sheet information includes the size, the number, and the like of the sheets P. The inspection settings include whether to perform an inspection, and the content of the inspection performed by the inspection apparatus 50 (the inspection area, the inspection level, and the like). The discharge destination information includes identification information of one of the stacking apparatuses 60*a* to 60*c* to serve as the discharge destination, and identification information of trays for a passing tray and a failing tray. The "passing tray" is a sheet tray to which sheets P which have passed the inspection are discharged. The "failing tray", meanwhile, is a sheet tray to which sheets P which have not passed the inspection are discharged. The passing tray and the failing tray are assumed to be selected in a screen displayed when the button 601*c* is pressed.

In step S1202, the CPU 201 (the inspection control unit 205) determines whether a request to send the reference data 211 has been received from the inspection apparatus 50. If no request has been received, the CPU 201 moves the sequence to step S1204. If a request has been received, the CPU 201 moves the sequence to step S1203.

In step S1203, the CPU 201 (the inspection control unit 205) reads out the reference data 211 from the memory 210 and sends the reference data 211 to the inspection apparatus 50.

In step S1204, the CPU 201 (the job processing unit 206) determines whether a notification indicating preparations are complete has been made by the inspection apparatus 50. The CPU 201 moves the sequence to step S1205 when a notification indicating preparations are complete has been made by the inspection apparatus 50.

In step S1205, the CPU 201 (the job processing unit 206) prints onto the sheet P by controlling the image forming apparatus 30. In step S1206, the CPU 201 (the inspection control unit 205) determines whether the inspection result received from the inspection apparatus 50 is "no good" (fail). If the inspection result is "pass", the CPU 201 moves the sequence from step S1206 to step S1208. If the inspection result is "fail", the CPU 201 moves the sequence from step S1206 to step S1207.

In step S1207, the CPU 201 (the job processing unit 206) instructs the image forming apparatus 30 to reprint. As a result, the image on the sheet P determined to have failed is reprinted onto another sheet P. The CPU 201 then moves the sequence from step S1207 to step S1205. Note that the reprinting may be scheduled to be performed after the printing has ended for all the pages based on the job data 212. In other words, the job data 212 for reprinting may be generated.

In step S1208, the CPU 201 (the job processing unit 206) determines whether all the printing based on the job data 212 is complete. If a page to be printed remains, the CPU 201 moves the sequence to step S1205, and prints the next page. If no pages remain to be printed, the CPU 201 ends the print job.

(8-3) Inspection Apparatus Operations

Figure 13:
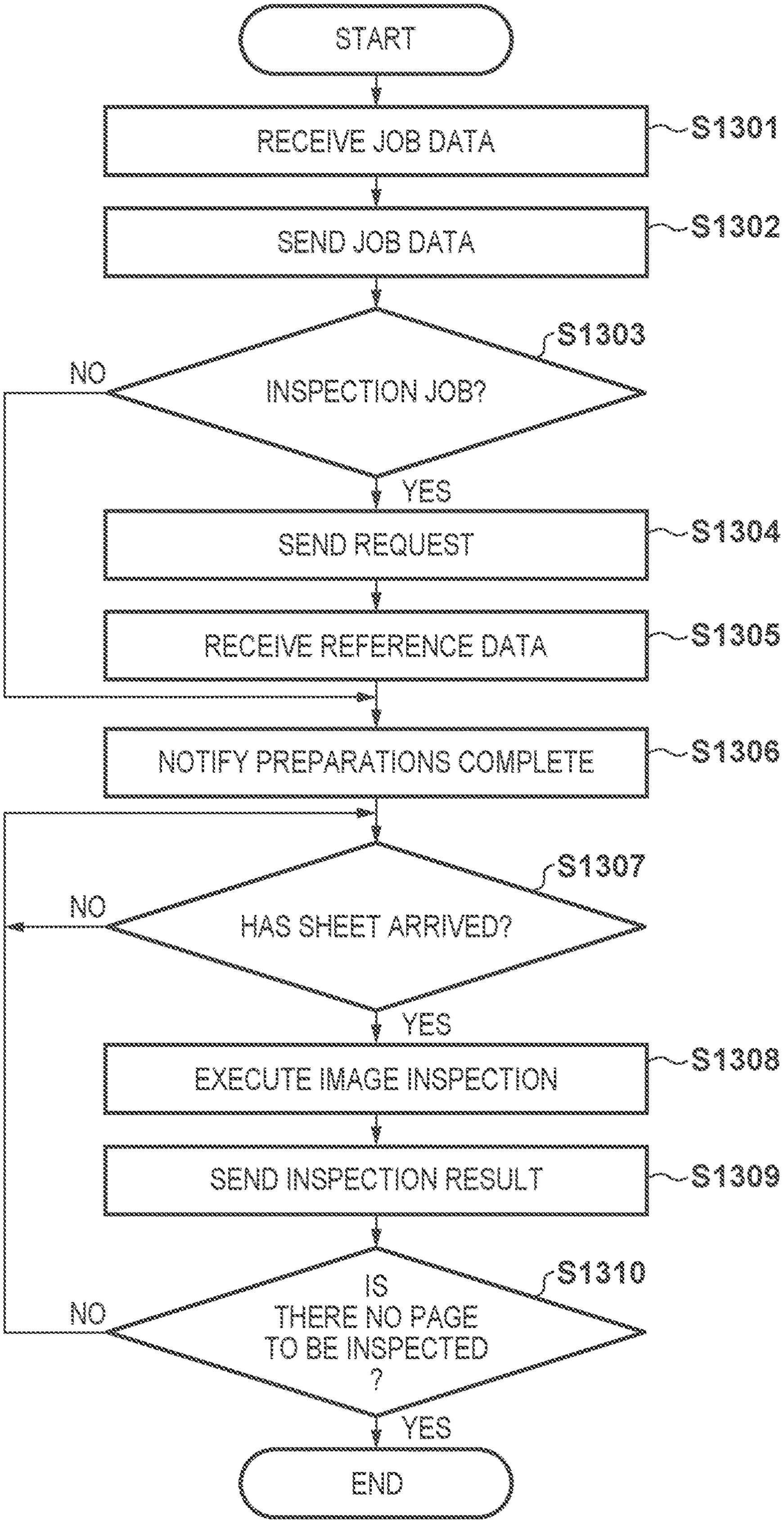
FIG. 13 is a flowchart illustrating a method for executing a job in the inspection apparatus.

FIG. 13 is a flowchart illustrating inspection processing executed by the CPU 301 of the inspection apparatus 50.

In step S1301, the CPU 301 receives the job data 314 from the control apparatus 40. The job data 314 may be stored in the memory 310. Alternatively, the job data 314 may be stored in the memory 310 as part of the job data 212. The job data 314 includes control information for the inspection apparatus 50 and control information applied to the stacking apparatuses 60.

In step S1302, the CPU 301 transmits the job data 411 to the stacking apparatus 60*a*, which is in a later stage. The job data 411 is part of the job data 314 and includes the control information applied to the stacking apparatuses 60.

In step S1303, the CPU 301 analyzes the job data 314 and determines whether the job data 314 instructs an inspection job to be executed. If no inspection job is instructed, the inspection apparatus 50 executes a conveyance job for conveying the sheet P to the stacking apparatus 60*a* in a later stage. If an inspection job is instructed, the CPU 301 moves the sequence to step S1304. If no inspection job is instructed, the CPU 301 moves the sequence to step S1306.

In step S1304, the CPU 301 sends, to the control apparatus 40, a request for the reference data 211.

In step S1305, the CPU 301 receives the reference data 211 from the control apparatus 40. The reference data 211 is stored in the memory 310.

In step S1306, the CPU 301 notifies the control apparatus 40 that preparations are complete. The notification that preparations are complete may also be sent to the stacking apparatuses 60*a* to 60*c* in later stages.

In step S1307, the CPU 301 determines whether a sheet P has arrived based on a detection signal output from the sheet sensor 56. A "sheet P arriving" means that the sheet sensor 56 has detected the leading end of the sheet P. When a sheet P arrives at the sheet sensor 56, the CPU 301 moves the sequence to step S1308.

In step S1308, the CPU 301 (the reading control unit 307 and the inspection unit 302) executes the image inspection designated by the job data 314. The reading control unit 307 reads the sheet P using the image sensors 54 and 55, and generates the inspection image data 312. Furthermore, the inspection unit 302 inspects the inspection image data 312 in accordance with the inspection settings designated by the job data 314. For example, the inspection unit 302 compares the inspection image data 312 with the reference data 211 and determines whether the image formed on the sheet P satisfies the passing criteria. The passing criteria are the passing criteria corresponding to the inspection level designated by the job data 314.

In step S1309, the CPU 301 (the inspection unit 302) sends the inspection result to the control apparatus 40 and the stacking apparatuses 60*a* to 60*c*. Note that if the job data 314 designates the stacking apparatus 60*b* as the discharge destination, the inspection result is sent to at least the stacking apparatus 60*b*. This is because the discharge destination is switched based on the inspection result.

In step S1310, the CPU 201 determines whether there are any pages to be inspected, designated by the job data 314. If there is a page remaining to be inspected, the CPU 301 moves the sequence to step S1307 and waits for the next sheet P to arrive. If no pages remain to be inspected, the CPU 301 ends the job.

(8-4) Stacking Apparatus Operations

Figure 14:
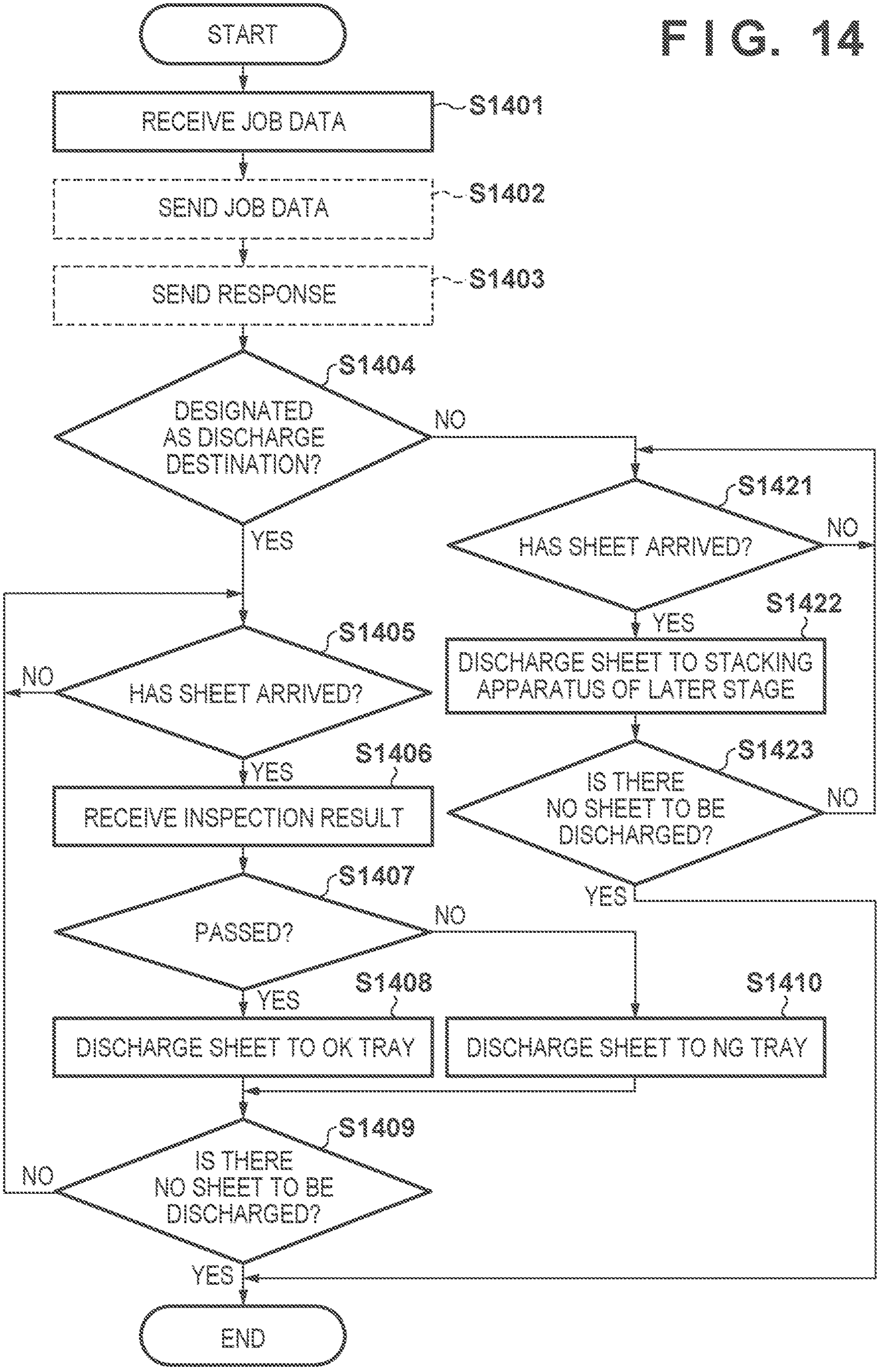
FIG. 14 is a flowchart illustrating a method for executing a job in a stacking apparatus.

FIG. 14 is a flowchart illustrating conveyance and discharge processing executed by the CPU 401 of the stacking apparatuses 60.

In step S1401, the CPU 401 (the job control unit 402) receives the job data 411 from the inspection apparatus 50 or the stacking apparatus 60 on the upstream side. Note that if a stacking apparatus 60 is present on the downstream side, the CPU 401 moves the sequence to step S1402.

In step S1402, the CPU 401 (the job control unit 402) sends the job data 411 to the stacking apparatus 60 on the downstream side. Note that if the stacking apparatus 60 is the stacking apparatus 60 furthest on the downstream side, in step S1403, a response indicating that the job data 411 has been successfully received is sent to the inspection apparatus 50 or the stacking apparatus 60 on the upstream side. The stacking apparatus 60 on the upstream side forwards the response to the inspection apparatus 50.

In step S1404, the CPU 401 determines whether it itself (i.e., the stacking apparatus 60) is designated as the discharge destination based on the job data 411. If the sheet P will pass through the stacking apparatus 60 itself and be discharged to a stacking apparatus 60 in a later stage, the CPU 401 moves the sequence to step S1421.

In step S1421, the CPU 401 determines whether the sheet P has arrived based on the detection signal from the sheet sensor 66. When the sheet P arrives, the CPU 401 moves the sequence to step S1422.

In step S1422, the CPU 401 controls the motor M1 and the solenoids SL1 and SL2 to discharge the sheet P to the stacking apparatus 60 in the later stage. In step S1423, the CPU 401 determines whether there is a sheet P to be discharged based on the job data 411. If there is a sheet P remaining to be discharged, the CPU 401 moves the sequence to step S1421. If there is no sheet P remaining to be discharged, the CPU 401 completes the conveyance job.

On the other hand, if the stacking apparatus 60 itself is designated as the discharge destination, the CPU 401 moves the sequence from step S1404 to step S1405. In step S1405, the CPU 401 determines whether the sheet P has arrived based on the detection signal from the sheet sensor 66. When the sheet P arrives, the CPU 401 moves the sequence to step S1406.

In step S1406, the CPU 401 receives the inspection result from the inspection apparatus 50. In step S1407, the CPU 401 determines whether the sheet P has passed the inspection based on the inspection result. If the sheet P has passed the inspection, the CPU 401 moves the sequence to step S1408.

In step S1408, the CPU 401 controls the motor M1 and the solenoids SL1 and SL2, and discharges the sheet P to the passing tray. If the sheet P has not passed the inspection, the CPU 401 moves the sequence to step S1410. In step S1410, the CPU 401 controls the motor M1 and the solenoids SL1 and SL2, and discharges the sheet P to the failing tray. The passing tray and the failing tray are designated in advance by the job data 411.

In step S1409, the CPU 401 determines whether there is a sheet P to be discharged based on the job data 411. If there is a sheet P remaining to be discharged, the CPU 401 moves the sequence to step S1405. If there is no sheet P remaining to be discharged, the CPU 401 completes the discharge job.

According to the present embodiment, an upper limit value for an appropriate inspection level is set in accordance with the performance (the image forming accuracy) of the image forming apparatus 30. This improves the usability for inspections. For example, situations where the image formation and inspections are stopped due to unnecessary failures will decrease. Deliverables which are discarded will be reduced, which ensures that resources such as sheets P, toner, electricity, and the like will be utilized effectively. The productivity of the image forming system 100 will be improved as well.

(9) Controller of Image Forming Apparatus

Figure 15:
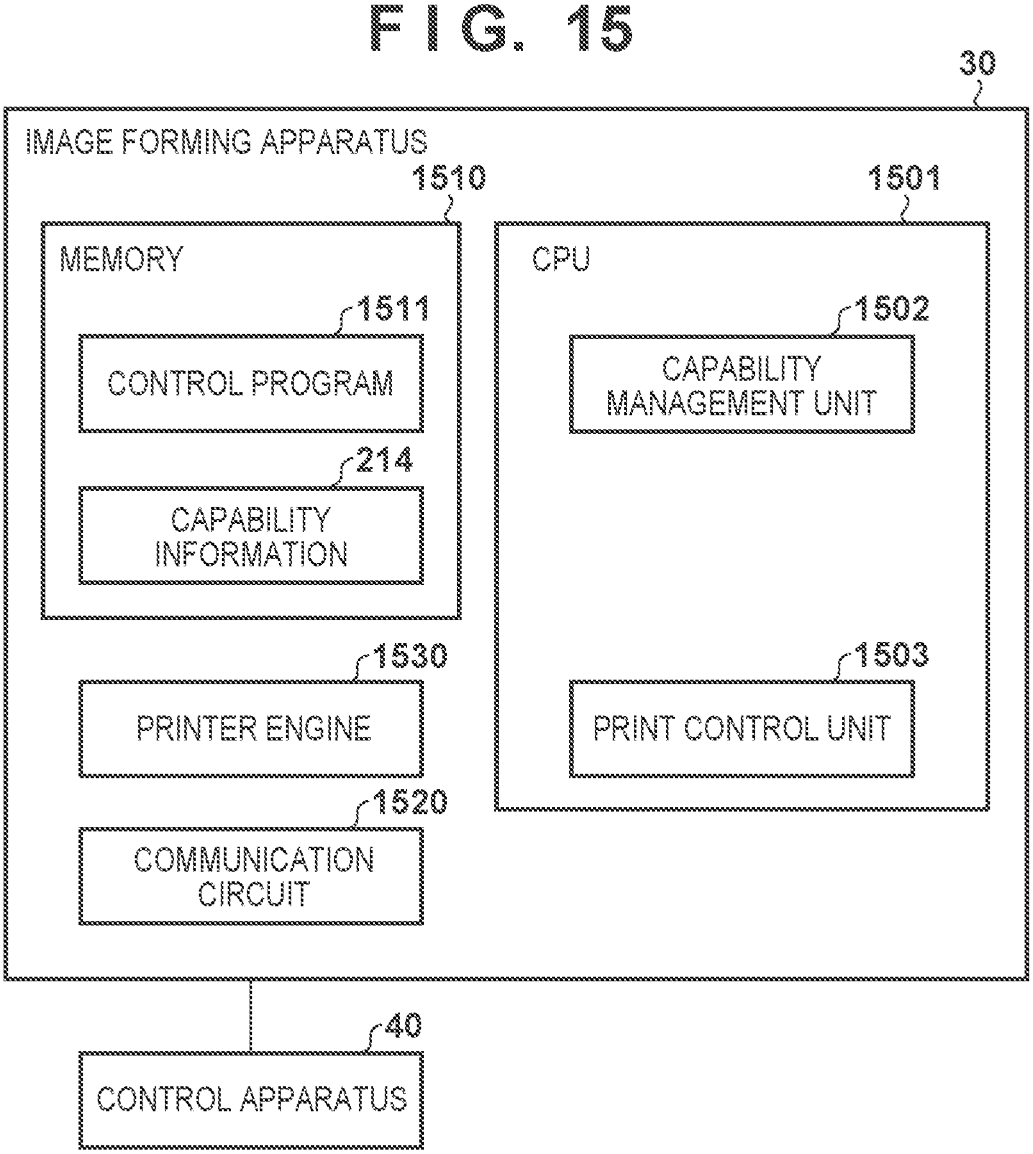
FIG. 15 is a diagram illustrating a controller of an image forming apparatus.

FIG. 15 illustrates a controller provided in the image forming apparatus 30. A CPU 1501 controls the image forming apparatus 30 according to a control program 1511 stored in a memory 1510. A capability management unit 1502 reads out the capability information 214 from the memory 1510 upon receiving a capability request from the control apparatus 40 through a communication circuit 1520. The capability management unit 1502 further sends the capability information 214 to the control apparatus 40 through the communication circuit 1520. A print control unit 1503 controls a printer engine 1530 based on commands from the control apparatus 40. The printer engine 1530 includes a motor that conveys the sheet P within the image forming apparatus 30, components involved in image formation (e.g., the photosensitive member 1, the charger 2, the exposure device 3, the developer 4, the primary transfer roller 5, the intermediate transfer belt 6, the secondary transfer section 7, and the fixer 8), and the like. As described above, the controller illustrated in FIG. 15 may be included in the control apparatus 40.

(10) Technical Spirit Derived from Embodiments

Item 1

The image forming apparatus 30 is an example of a printing unit that prints an image onto a sheet P. The CPUs 201 and 501 and the capability obtainment unit 503 are examples of an obtainment unit that obtains information associated with the printing unit (e.g., the capability information 214 indicating the printing capabilities). The CPUs 201 and 501 and the level determination unit 504 function as a determination unit that, based on the information associated with the printing unit, determines a plurality of inspection levels that can be applied to inspection. The CPUs 201 and 501 and the selection unit 506 are examples of a selection unit that selects one inspection level among the plurality of inspection levels determined. The inspection apparatus 50 and the like are an example of an inspection unit that inspects a printing result by applying the one inspection level selected.

If an inspection level (passing criteria/failing criteria) exceeding the capabilities of the image forming apparatus 30 is set by the user, the number of failing products will increase, which reduces the usability. According to Item 1, options for the inspection level are determined in accordance with the capabilities of the image forming apparatus 30. It is therefore easy for the user to select an inspection level that fits the capabilities. This reduces the number of failing products and improves the usability for inspections.

Item 2

The display device 21 and the display device 521 function as a display unit that displays the plurality of inspection levels (options) determined. The input device 22 and the input device 522 are an example of an input unit that accepts an input indicating that one inspection level is selected from the plurality of inspection levels displayed.

Item 3

The display device 21 and the display device 521 display a list (the list 703*a*) including N inspection levels. At this time, the display device 21 and the display device 521 may execute the display so as to distinguish between M inspection levels that are selectable (e.g., inspection levels 1 to 8) and N-M inspection levels that are unselectable (e.g., inspection levels 9 and 10). This makes it possible for the user to visually understand the selectable inspection levels and the unselectable inspection levels. N and M are integers.

Item 4

The display device 21 and the display device 521 may gray out the N-M inspection levels that are unselectable. The grayed-out inspection levels cannot be selected by the user. As a result, the user can be made aware of the existence of unselectable inspection levels, while also actually being unable to select those inspection levels. Note that the list 703*a* may be displayed as a drop-down list. This enables the user to easily recognize the inspection level options.

Item 5

A notification may be displayed when one or more unselectable inspection levels, among the N inspection levels, are selected by the user through the selection unit. This notification may include, for example, a message prompting the user to change, review, or lower the inspection level.

Item 6

As illustrated in FIG. 10, the display device 21 and the display device 521 may display a reason why the N-M inspection levels that are unselectable are unselectable. This enables the user to easily understand why a specific inspection level is unselectable.

Item 7

As illustrated in FIG. 10, the reason may include that the printing accuracy (the image forming accuracy) is insufficient. This motivates the user to introduce an image forming apparatus 30 providing a higher printing accuracy.

Item 8

As illustrated in FIG. 10, the display device 21 and the display device 521 may display details of an operation required to make the unselectable N-M inspection levels selectable. The user may desire a higher inspection level. By performing the displayed details of the operation, such a user can set a higher inspection level in the inspection apparatus 50.

Item 9

As illustrated in FIG. 10, the details of the operation may include a message prompting the user to replace the printing unit. Through this, the user will be able to select a higher inspection level by replacing the image forming apparatus 30 with another image forming apparatus 30.

Item 10

As illustrated in FIG. 10, the details of the operation may include identification information of one or more printing units (e.g., the image forming apparatuses B and C) for which the unselectable N-M inspection levels are to be made selectable. Through this, the user can know about a higher-accuracy image forming apparatus that can achieve a higher inspection level.

Item 11

Note that the capability information 214 may include the upper limit value itself, or may include information associated with the upper limit value (e.g., the printing accuracy or the identification information of the image forming apparatus 30). In this case, the memories 210 and 510 may function as a storage unit that stores an inspection upper limit level, which is an upper limit value for the inspection level that can be applied by the inspection unit, for each of a plurality of instances of identification information. The CPUs 201 and 501 may obtain the inspection upper limit level (e.g., LV_max) corresponding to the identification information from the memories 210 and 510, and determine a plurality of inspection levels that are no greater than the inspection upper limit level.

Item 12

The plurality of inspection levels may be associated with passing criteria or failing criteria for the printing result. For example, the inspection level may be associated with a permissible range of color shift amounts or the like. The inspection level may be associated with a permissible range of tint variation amounts. The inspection level may be associated with a permissible number or surface area of stain (black spots). The inspection level may be associated with a permissible thickness, length, or surface area of a streak.

Items 13 and 14

The display device 521 and the input device 522 may be provided in the host computer 90 that instructs the printing unit to print. As illustrated in FIG. 1, the operation unit 20 including the display device 21 and the input device 22 may be attached to a housing of the printing unit.

Item 15

The stacking apparatuses 60*a* to 60*c* are an example of a stacking unit in which a sheet for which the printing result is determined to have failed is stacked.

Item 16

When a printing result is determined to be a failure, the image forming apparatus 30 may reprint the image on another sheet (recovery processing). This improves the usability with respect to reprinting.

Item 17

The plurality of inspection levels may be levels which require a higher printing accuracy as the numerical value of the level increases. For example, the printing accuracy required at inspection level 10 is higher than the printing accuracy required at inspection level 9. Note that the plurality of inspection levels may instead be levels which require a higher printing accuracy as the numerical value of the level decreases.

Item 18

The inspection apparatus 50 may inspect one or more of misalignment in the position at which the image is formed, color shift in the image, tint variations in the image, or the presence or absence of an unexpected image formed on the sheet (e.g., a black spot or a streak) in the printing result.

Item 19

The CPUs 201 and 501 may obtain the capability information 214 indicating the printing capabilities. The capability information 214 may include or be associated with any one of the inspection upper limit level, a plurality of inspection levels no greater than the inspection upper limit level, or one or more unselectable inspection levels which exceed the inspection upper limit level. The CPUs 201 and 501 may determine a plurality of inspection levels that can be applied to inspection based on the capability information 214.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-069519, filed Apr. 20, 2023 which is hereby incorporated by reference herein in its entirety.

What is claimed is:

1. An apparatus capable of connecting to each of a first image forming apparatus and a second image forming apparatus having a higher printing accuracy than the first image forming apparatus, the apparatus comprising:

an inspection apparatus (i) including a reading sensor configured to read an image formed on a sheet by an image forming apparatus that is connected to the apparatus capable of connecting to each of the first image forming apparatus and the second image forming apparatus and (ii) being configured to inspect an inspection item in the image read by the reading sensor;

a display configured to display an inspection level that corresponds to an inspection standard used to determine an inspection result for the inspection item such that the inspection level is selectable from among a plurality of inspection levels; and a controller configured to:

display a first plurality of inspection levels in a case where the first image forming apparatus is connected to the apparatus;

display a second plurality of inspection levels in a case where the second image forming apparatus is connected to the apparatus, an upper limit for the second plurality of inspection levels being higher than an upper limit for the first plurality of inspection levels;

obtain information indicating a selection result of selecting the inspection level; and determine the inspection standard based on the information.

2. The apparatus according to claim 1, wherein the inspection apparatus is configured to obtain a reference image to be compared with the image read by the reading sensor, and the printing accuracy affects a difference between the image read by the reading sensor and the reference image.

3. The apparatus according to claim 1, wherein the inspection apparatus is configured to obtain a reference image to be compared with the image read by the reading sensor, and the inspection item is misalignment between the reference image and the image read by the reading sensor.

4. The apparatus according to claim 1, wherein the inspection apparatus is configured to obtain a reference image to be compared with the image read by the reading sensor, and the inspection item is a color shift between the reference image and the image read by the reading sensor.

5. The apparatus according to claim 1, wherein the inspection item is a tint variation in the image read by the reading sensor.

6. The apparatus according to claim 1, wherein the inspection item is a streak appearing in the image read by the reading sensor.

7. The apparatus according to claim 1, wherein the inspection item is a black spot appearing in the image read by the reading sensor.

8. The apparatus according to claim 1, wherein the display is configured to display the plurality of inspection levels such that an inspection level higher than the upper limit for the first plurality of inspection levels cannot be selected, in a case where the first image forming apparatus is connected.

9. The apparatus according to claim 8, wherein the display is configured to gray out an inspection level higher than the upper limit for the first plurality of inspection levels, in a case where the first image forming apparatus is connected.

10. The apparatus according to claim 1, wherein the display is configured to display a message prompting the inspection level for the inspection item to be changed upon an inspection level higher than the upper limit for the first plurality of inspection levels being selected, in a case where the first image forming apparatus is connected.

11. A method for controlling an apparatus capable of connecting to each of a first image forming apparatus and a second image forming apparatus having a higher printing accuracy than the first image forming apparatus, the apparatus being configured to read an image formed on a sheet by the first image forming apparatus or the second image forming apparatus and to inspect an inspection item in the image that has been read, the method comprising:

displaying a screen for selecting an inspection level that corresponds to an inspection standard used to determine an inspection result for the inspection item, the screen displaying a first plurality of inspection levels to be selectable in a first case where the first image forming apparatus is connected to the apparatus, and the screen displaying a second plurality of inspection levels to be selectable in a second case different from the first case where the second image forming apparatus is connected to the apparatus, and an upper limit for the second plurality of inspection levels being higher than an upper limit for the first plurality of inspection levels;

obtaining information indicating a selection result of selecting the inspection level; and determining the inspection standard based on the information.

12. The method according to claim 11, further comprising:

obtaining a reference image to be compared with the image read by the apparatus, wherein the printing accuracy affects a difference between the image read by the apparatus and the reference image.

13. The method according to claim 11, further comprising:

obtaining a reference image to be compared with the image read by the apparatus, wherein the inspection item is misalignment between the reference image and the image read by the apparatus.

14. The method according to claim 11, further comprising:

obtaining a reference image to be compared with the image read by the apparatus, wherein the inspection item is a color shift between the reference image and the image read by the apparatus.

15. The method according to claim 11, wherein the inspection item is a tint variation in the image read by the apparatus.

16. The method according to claim 11, wherein the inspection item is a streak appearing in the image read by the apparatus.

17. The method according to claim 11, wherein the inspection item is a black spot appearing in the image read by the apparatus.

18. The method according to claim 11, further comprising:

displaying a plurality of inspection levels in the screen such that an inspection level higher than the upper limit for the first plurality of inspection levels cannot be selected, in the first case where the first image forming apparatus is connected.

19. The method according to claim 11, further comprising:

graying out an inspection level higher than the upper limit for the first plurality of inspection levels among the plurality of inspection levels displayed in the screen, in the first case where the first image forming apparatus is connected.

20. The method according to claim 11, further comprising:

displaying a message prompting the inspection level for the inspection item to be changed upon an inspection level higher than the upper limit for the first plurality of inspection levels being selected, in the first case where the first image forming apparatus is connected.

* * * * *